United States Patent
Aoki et al.

(10) Patent No.: US 9,395,191 B2
(45) Date of Patent: Jul. 19, 2016

(54) NAVIGATION APPARATUS

(71) Applicant: Clarion Co., Ltd., Saitama-shi, Saitama (JP)

(72) Inventors: Toshiyuki Aoki, Hitachi (JP); Koichi Kato, Ageo (JP); Akihiro Kawabata, Koriyama (JP); Zhixing Liu, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 124 days.

(21) Appl. No.: 13/895,915

(22) Filed: May 16, 2013

(65) Prior Publication Data

US 2013/0311086 A1 Nov. 21, 2013

(30) Foreign Application Priority Data

May 17, 2012 (JP) .................................. 2012-112991

(51) Int. Cl.
- G01C 21/26 (2006.01)
- G01C 21/32 (2006.01)
- G01C 21/00 (2006.01)
- G01C 21/30 (2006.01)

(52) U.S. Cl.
CPC .............. G01C 21/26 (2013.01); G01C 21/005 (2013.01); G01C 21/30 (2013.01); G01C 21/32 (2013.01)

(58) Field of Classification Search
CPC ........ G01C 21/26; G01C 21/30; G01C 21/00; G01C 21/005; G01C 21/04; G01C 21/06; G01C 21/28; G01C 21/32; G01C 21/34
USPC ......... 701/446, 447, 448, 450, 466, 518, 532, 701/534, 411
See application file for complete search history.

(56) References Cited

U.S. PATENT DOCUMENTS

| 5,852,791 | A | 12/1998 | Sato et al. | |
| 6,173,232 | B1 * | 1/2001 | Nanba et al. | 701/446 |
| 6,199,011 | B1 | 3/2001 | Matsuda | |
| 2004/0125989 | A1 * | 7/2004 | Kimura | 382/113 |

(Continued)

FOREIGN PATENT DOCUMENTS

| CN | 1677059 A | 10/2005 |
| CN | 101101214 A | 1/2008 |

(Continued)

OTHER PUBLICATIONS

European Search Report issued in counterpart European Application No. 13168210.6 dated Jan. 14, 2016 (16 pages).

*Primary Examiner* — Tuan C. To
*Assistant Examiner* — Genna Mott
(74) *Attorney, Agent, or Firm* — Crowell & Moring LLP

(57) ABSTRACT

A navigation apparatus includes: a map information storage unit that stores road information; a position estimation unit that estimates the position of the vehicle; a map matching unit that specifies link candidate points corresponding to the position of the vehicle; a parallel roads determination unit that detects links of parallel roads that extend mutually parallel to one another; a traveling link determination unit that, for each link of the parallel roads, determines whether it is a traveling link upon which the vehicle is traveling, or a parallel link that extends parallel to the traveling link; and a link position correction unit that obtains position correction amounts for nodes of the traveling link and of the parallel link on the basis of the distance between the link candidate point that corresponds to the traveling link and the position of the vehicle.

9 Claims, 16 Drawing Sheets

(56) References Cited

U.S. PATENT DOCUMENTS

| | | |
|---|---|---|
| 2005/0102098 A1* | 5/2005 | Montealegre et al. ........ 701/209 |
| 2005/0222758 A1 | 10/2005 | Ichida |
| 2007/0233366 A1 | 10/2007 | Lin |
| 2008/0004804 A1 | 1/2008 | Fujita et al. |
| 2008/0021638 A1 | 1/2008 | Kobayashi |
| 2008/0300781 A1 | 12/2008 | Sakai |
| 2011/0040479 A1 | 2/2011 | Uyama |
| 2011/0106431 A1 | 5/2011 | Tomobe et al. |
| 2011/0208496 A1 | 8/2011 | Bando et al. |
| 2011/0219027 A1 | 9/2011 | Uyama |
| 2012/0036229 A1 | 2/2012 | Uyama et al. |

FOREIGN PATENT DOCUMENTS

| | | |
|---|---|---|
| CN | 102016500 A | 4/2011 |
| CN | 102057251 A | 5/2011 |
| CN | 102192745 A | 9/2011 |
| CN | 102209880 A | 10/2011 |
| CN | 102414538 A | 4/2012 |
| JP | 3-108100 A | 5/1991 |
| JP | 4-278982 A | 10/1992 |
| JP | 9-304093 A | 11/1997 |
| JP | 11-23300 A | 1/1999 |
| JP | 11-233000 | 8/1999 |
| JP | 2000-230835 A | 8/2000 |
| JP | 2002-279437 A | 9/2002 |
| JP | 3451162 B2 | 9/2003 |
| JP | 2004-198811 A | 7/2004 |
| JP | 2008-202941 A | 9/2008 |
| JP | 2008-261915 A | 10/2008 |
| JP | 2008-298573 A | 12/2008 |
| WO | WO 2009/014326 A1 | 1/2009 |

* cited by examiner

PRIOR ART

NAVIGATION APPARATUS

INCORPORATION BY REFERENCE

The disclosure of the following priority application is herein incorporated by reference: Japanese Patent Application No. 2012-112991 filed on May 17, 2012.

BACKGROUND OF THE INVENTION

1. Field of the Invention

The present invention relates to a navigation apparatus that calculates the position of a vehicle and displays this position upon a map.

2. Description of Related Art

In the prior art, in a navigation apparatus that displays a road map based upon road data, it is per se known to correct the road data in consideration of the track along which the vehicle actually travels. For example, with the prior art technique disclosed in Patent Document #1 (Japanese Laid-Open Patent Publication 2000-230835), each time the same road is traversed three times or more, road data for correction is generated by performing averaging processing upon the tracks along which the vehicle has traveled. If the deviation between this road data for correction and the original road data is greater than some predetermined permitted value, then the road data is replaced with the road data for correction. By doing this it is ensured that, even if there is a positional error in the road data, this error is corrected, so that it is possible to perform appropriate route guidance without any deviation between the road upon which the vehicle is actually traveling and the road that is displayed.

Furthermore, with the prior art technique disclosed in Patent Document #2 (Japanese Laid-Open Patent Publication H11-23300), the positions of entry points, exit points, center points and so on of curved roads and branching roads are detected on the basis of change of the orientation of the vehicle, and errors in the road data are corrected on the basis of the results of this detection. By doing this, the road data for curved roads and branching roads are corrected.

With the prior art techniques of Patent Documents #1 and #2, if a plurality of roads extend mutually parallel adjacent to one another, while it is possible to correct the road data for the one of these roads upon which the vehicle has traveled, it is not possible to correct the road data for the other roads. Due to this, sometimes it happens that the positional relationship between a road for which the road data has been corrected and a road or roads that extend parallel to this road becomes inverted, and this is not desirable. In this type of case, the problem may arise that mis-matching takes place when next the vehicle travels upon these roads, and that it may not be possible correctly to recognize which one of the roads is being travelled upon.

The present invention has been conceived in consideration of problems such as described above, and its object is to provide a navigation apparatus that is capable of correcting the road data for a plurality of roads that extend mutually parallel in an accurate manner, and that is capable of recognizing the correct road when next the vehicle travels upon one of these roads.

SUMMARY OF THE INVENTION

A navigation apparatus according to a first aspect of the present invention includes: a map information storage unit that stores road information related to roads; a position estimation unit that estimates the position of the vehicle; a map matching unit that, using the road information, specifies a plurality of link candidate points corresponding to the position of the vehicle as estimated by the position estimation unit; a parallel roads determination unit that, on the basis of the plurality of link candidate points, detects links of parallel roads that extend mutually parallel to one another; a traveling link determination unit that, for each link of the parallel roads detected by the parallel roads determination unit, determines whether it is a traveling link upon which the vehicle is traveling, or a parallel link that extends parallel to the traveling link; and a link position correction unit that obtains position correction amounts for nodes of the traveling link and of the parallel link on the basis of the distance between the one of the plurality of link candidate points that corresponds to the traveling link, and the position of the vehicle as estimated by the position estimation unit.

According to a second aspect of the present invention, the navigation apparatus of the first aspect may further include a link position correction implementation determination unit that makes a decision whether or not to implement link position correction, on the basis of the distance between the link candidate point that corresponds to the traveling link and the position of the vehicle estimated by the position estimation unit. In this navigation apparatus, it is preferred that the link position correction unit does not obtain position correction amounts for the nodes of the traveling link and the parallel link, if it has been decided by the link position correction implementation determination unit not to implement link position correction.

According to a third aspect of the present invention, the navigation apparatus of the first or second aspect may further include a link position correction range determination unit that determines a first correction range on the basis of the distance between the link candidate point that corresponds to the traveling link and the position of the vehicle as estimated by the position estimation unit. In this navigation apparatus, it is preferred that the link position correction unit obtains position correction amounts for nodes that are included in a traveling link series constituted by a plurality of the traveling links or a parallel link series constituted by a plurality of the parallel links, and that are within the first correction range.

According to a fourth aspect of the present invention, in the navigation apparatus of the third aspect, it is preferred that: the link position correction range determination unit further determines a second correction range on the basis of a value obtained by dividing the position correction amount of nodes that are positioned at the boundary of the first correction range by the tangent of a predetermined permissible azimuth error; and the link position correction unit further obtains position correction amounts for nodes that are included in the traveling link series or the parallel link series, and that are within the second correction range, on the basis of the position correction amounts of the nodes that are positioned at the boundary of the first correction range, and the distances from the nodes that are positioned at the boundary of the first correction range to those nodes.

According to a fifth aspect of the present invention, the navigation apparatus of the fourth aspect may further include a map correction amount storage unit that, for nodes for which position correction amounts have been obtained by the link position correction unit, stores those position correction amounts. In this navigation apparatus, it is preferred that the map matching unit corrects the positions of nodes for which position correction amounts have been obtained by the link position correction unit and specifies the plurality of link candidate points, on the basis of the position correction amounts stored in the map correction amount storage unit.

According to a sixth aspect of the present invention, in the navigation apparatus of the fifth aspect, it is preferred that: the map correction amount storage unit, for each node for which a position correction amount has been obtained by the link position correction unit, in addition to that position correction amount, also stores a correction range type that specifies whether that node belongs to the first correction range or to the second correction range; for a link candidate point, among the plurality of link candidate points, that corresponds to a link of which the position of at least one node has been corrected, the map matching unit decides to which of the first correction range or to the second correction range that node belongs, on the basis of the correction range type stored in the map correction amount storage unit; if it has been decided that both the nodes at the two ends of a link that corresponds to the link candidate point both belong to the first correction range, the map matching unit calculates the evaluation value for the link candidate point using the link azimuth corresponding to the node position after correction; and if it has been decided that at least one of the nodes at the two ends of a link that corresponds to the link candidate point belongs to the second correction range, the map matching unit calculates the evaluation value for the link candidate point using the link azimuth corresponding to the node position before correction.

According to a seventh aspect of the present invention, in the navigation apparatus of any one of the first through sixth aspects, it is preferred that, for a node among the nodes of the traveling link and the parallel link to which a plurality of links are connected, the link position correction unit obtains the position correction amount for that node so that the sum of squares of the amount of azimuth change of each link connected to that node becomes a minimum.

According to an eighth aspect of the present invention, the navigation apparatus of any one of the first through seventh aspects may further include a traveling position indication unit that indicates the road upon which the vehicle is traveling on the basis of input from the user. In this navigation apparatus, it is preferred that the traveling link determination unit determines the traveling link on the basis of indication from the traveling position indication unit.

A navigation apparatus according to a ninth aspect of the present invention includes: a map information storage unit that stores road information related to roads; a screen and audio output unit that displays a road map using the road information; a traveling position indication unit that indicates the road upon which the vehicle is traveling on the basis of input from the user; a traveling link determination unit that, on the basis of indication from the traveling position indication unit, determines whether it is the traveling link upon which the vehicle is traveling, or a parallel link that extends parallel to the traveling link; and a link position correction unit that corrects the position of the traveling link and the parallel link. In this navigation apparatus, it is preferred that the screen and audio output unit shifts the traveling link and the parallel link upon the road map, so as to match their positions after correction by the link position correction unit.

According to the present invention, it is possible accurately to correct road data for a plurality of roads that extend mutually parallel, and to recognize the correct road when next the vehicle travels upon one of these roads.

DESCRIPTION OF THE PREFERRED EMBODIMENTS

Figure 1:
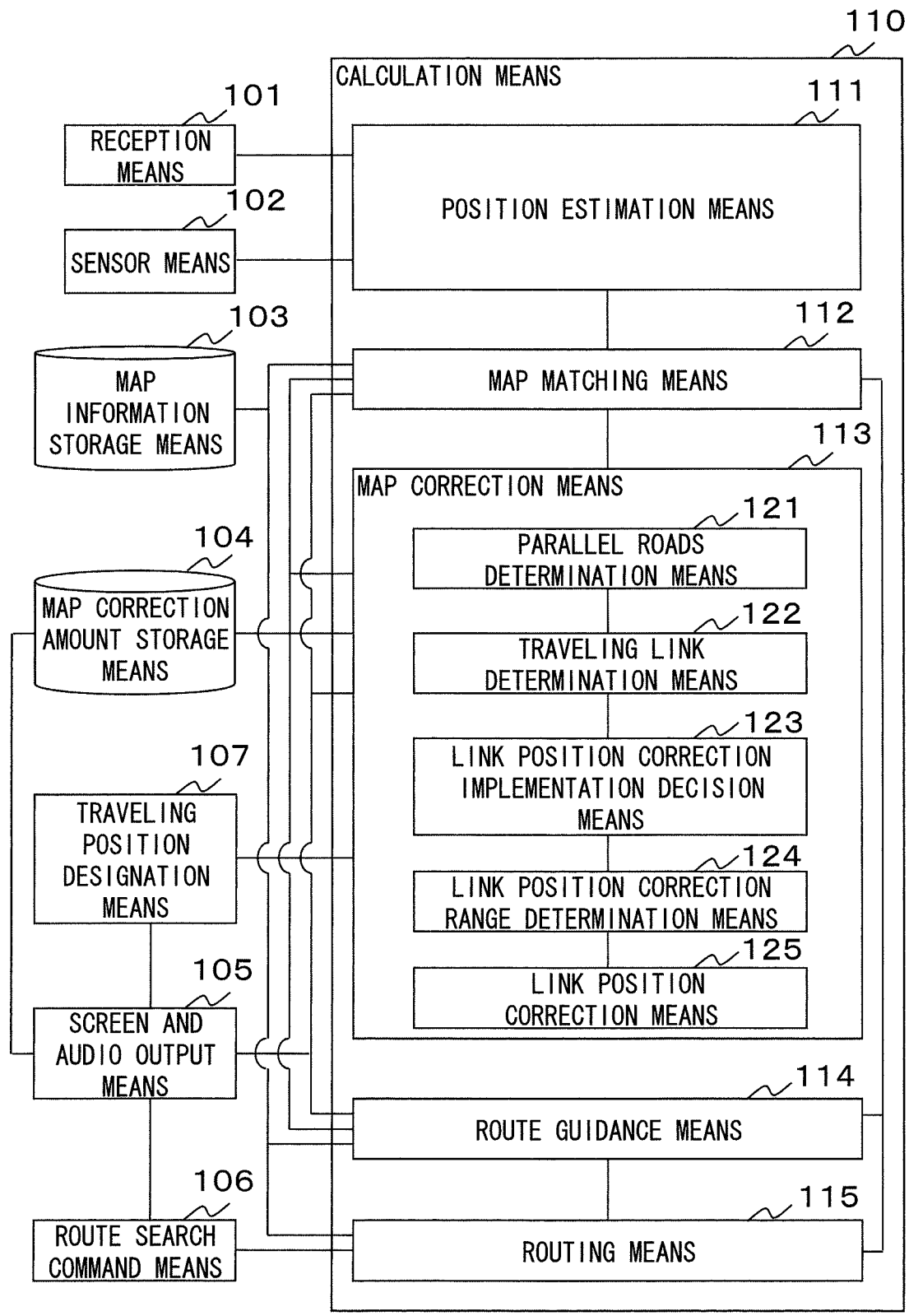
FIG. 1 is a figure showing the structure of a car navigation apparatus that is an embodiment of the present invention.

FIG. 1 shows the structure of a car navigation apparatus according to an embodiment of the present invention. The car navigation apparatus shown in FIG. 1 includes a reception means 101, a sensor means 102, a map information storage means 103, a map correction amount storage means 104, a screen and audio output means 105, a route search command means 106, a traveling position designation means 107, and a calculation means 110.

The reception means 101 is implemented as, for example, a GPS (Global Positioning System) receiver or the like. The reception means 101 includes an antenna, and signals sent from positioning satellites (i.e. positioning signals) are received by this antenna.

The reception means 101 also is endowed with certain processing functions: down conversion, analog to digital conversion, quadrature detection, C/A (Coarse/Acquisition) code generation, correlation detection, and decoding. The down conversion function is a function for converting high frequency positioning signals that have been received by the antenna into low frequency positioning signals. The analog to digital conversion function is a function for converting the positioning signals at low frequency after down conversion from analog signals into digital signals. The quadrature detection function is a function for performing demodulation upon these positioning signals that have been converted to digital signals. The C/A code generation function is a function for generating so-called C/A code reference symbol strings that are determined in advance for each positioning satellite. The correlation detection function is a function for detecting the correlation values between the positioning signals that have been demodulated and the C/A codes that have been generated. And the decoding function is a function for decoding the positioning signals on the basis of the correlation values that have been detected by the correlation detection function.

On the basis of the positioning signals that have thus been decoded, the reception means 101 detects navigation messages that include information about the tracks of the positioning satellites, information about transmission state, ionospheric delay calculation parameters, and so on. Furthermore, observational data is measured such as the time points of reception of the positioning signals, the pseudo-ranges specified by the positioning signals (i.e. the distances from the satellites), their Doppler frequencies, their signal strengths, and so on. And the positions of the positioning satellites are calculated on the basis of the time points of reception that have been measured and the track information in the navigation messages, and the position of the vehicle to which the antenna is installed (i.e. its position at reception), in other words the position of the vehicle to which the car navigation apparatus of FIG. 1 is mounted (hereinafter termed the "subject vehicle"), is detected on the basis of these positions of the positioning satellites and their pseudoranges that have been measured. Moreover, the speeds of the positioning satellites are calculated from the positions of the positioning satellites in the vicinity of the time points of reception, and, on the basis of the results of this calculation and the positions and Doppler frequencies of the positioning satellites, the speed and the direction of progression of the subject vehicle (i.e. its velocity vector: its speed at reception and its azimuth at reception) are calculated.

While, in the above description, an example has been explained in which the positioning satellites are GPS satellites, it would also be acceptable, instead of GPS satellites, to arrange to employ GLONASS (Global Navigation Satellite System) satellites or pseudolites or the like. These positioning satellites are devices that emit signals for positioning, either from space or from the Earth's surface.

The sensor means 102 includes a vehicle speed sensor such as a vehicle speed pulse counter or the like for detecting the speed of the subject vehicle, an angular velocity sensor such as a gyro or the like for detecting the angular velocity of the subject vehicle, and an acceleration sensor such as an accelerometer or the like for detecting the acceleration of the subject vehicle. The speed of the subject vehicle (i.e. the sensed speed), its angular velocity (i.e. the sensed angular velocity), and its acceleration (i.e. the sensed acceleration) are respectively outputted from these sensors. It should be understood that the speed is a quantity related to the fore and aft direction of the subject vehicle, the angular velocity is a quantity related to the roll angle, the pitch angle, and the yaw angle of the vehicle, and the acceleration is a quantity related to the vertical direction.

The map information storage means 103 is constituted by a hard disk or a memory or the like, and stores, for each of certain predetermined mesh regions, information related to roads such as road information and guidance displays and so on. For each of the mesh regions, the road information includes information such as node numbers for designating the roads within that mesh region, the positions of those nodes, link numbers, start point node numbers, end point node numbers, numbers of lanes upon roads, and so on. It should be understood that the nodes are points that are set to correspond to intersections or branch points or the like upon the roads, while the links are lines each of which joins between two successive nodes along a road.

The map correction amount storage means 104 is constituted by a hard disk or a memory or the like, and, for those nodes whose positions upon the roads specified by the road information stored in the map information storage means 103 described above have been corrected, stores correction amounts for their positions.

The positions of the nodes upon the roads are corrected as appropriate by the operation of the map correction means 113, as will be described hereinafter. When the position of a node has been corrected, position correction amounts for that node in the latitude direction and in the longitude direction are stored in the map correction amount storage means 104 in correspondence with the node number for identifying that node. It should be understood that each of the meshes is separated into a predetermined number of parcels, and the data stored in the map correction amount storage means 104 for the node position correction amounts is managed by parcel numbers that are set in advance for each of the parcels.

The screen and audio output means 105 includes a monitor and a speaker or the like. This screen and audio output means 105 reads in road information from the map information storage means 103 and node position correction amounts from the map correction amount storage means 104. And the positions of the nodes in the road information are corrected on the basis of the node position correction amounts that have been read in, and a road map is displayed by drawing links to match the positions of the nodes after correction.

Moreover, the screen and audio output means 105 receives an estimated position, an estimated azimuth, the position, azimuth, and link number of a first link candidate point, and a road deviation determination result from a map matching means 112 that will be described hereinafter. It should be understood that the details of these various items of information will be explained hereinafter. And, if the road deviation determination result from the map matching means 112 specifies traveling upon a road, then the screen and audio output means 105 draws the position and the azimuth of the first link candidate point upon the road map as a car mark. On the other hand, if the road deviation determination result from the map matching means 112 specifies deviation from the road, then the screen and audio output means 105 draws the estimated position and the estimated azimuth upon the road map as a car mark.

Furthermore, the screen and audio output means 105 acquires information such as a guidance direction signal, a guidance display, and a road guidance signal from a route guidance means 114 that will be described hereinafter. It should be understood that the details of these various items of information will be explained hereinafter. And, if the road guidance signal from the route guidance means 114 is ON, then the screen and audio output means 105 outputs a predetermined guidance display, and also outputs guidance instructions via audio.

The route search command means 106 is a means for the user to input a destination and to command searching for a route, and may include a remote controller, a touch panel, a microphone, or the like. Information about a destination that has been inputted from the user by use of this route search command means 106 is sent to the routing means 115.

The traveling position designation means 107 is a means for designating a road that corresponds to the traveling position of the vehicle on the basis of input from the user, and may include a remote controller, a touch panel, a microphone, or the like. When a road that corresponds to the traveling position of the vehicle is inputted from the user by use of this traveling position designation means 107, the number of the link that corresponds to this travel road is sent to the map correction means 113.

The calculation means 110 includes a CPU (Central Processing Unit, i.e. a central calculation processing device), a memory, and so on. Functionally, this calculation means 110 includes a position estimation means 111, a map matching means 112, a map correction means 113, a route guidance means 114, and a routing means 115.

The position estimation means 111 inputs the position at signal reception, the speed at signal reception, and the azimuth at signal reception from the reception means 101, and also inputs the sensed speed, the sensed angular velocity, and the sensed acceleration from the sensor means 102. And, using this input information, the position estimation means 111 calculates the position of the car navigation apparatus (i.e. its estimated position), its azimuth (i.e. its estimated azimuth), and its speed (i.e. its estimated speed), and also calculates the error covariance of the estimated position and the estimated azimuth.

From the estimated position calculated by the position estimation means 111, the map matching means 112 specifies a predetermined number of meshes (for example, four) in order of proximity, and reads in and acquires the road information and the node position correction amounts for these meshes from the map information storage means 103 and from the map correction amount storage means 104 respectively. And the map matching means 112 calculates an evaluation value for each link candidate point, using the estimated position and the estimated azimuth calculated by the position estimation means 111 and their error covariance, and the road information and node position correction amounts that have been acquired. It should be understood that the method of calculation of the evaluation value for each of the link candidate points will be explained subsequently in detail. And, on the basis of the results of this evaluation values calculation, the map matching means 112 specifies that link candidate point at which the probability that the subject vehicle is traveling is highest as being the first link candidate point, and, along with setting the link number of this first link candidate point, also calculates its position and azimuth.

And the map matching means 112 poses the null hypothesis that the subject vehicle is travelling upon the link, and a hypothesis that is alternative thereto. Then, on the basis of statistical hypothesis testing, and using the estimated position and the estimated azimuth calculated by the position estimation means 111 and their error covariance, and the road information and node position correction amounts that have been acquired, the map matching means 112 makes a decision as to whether or not the subject vehicle has deviated from the road, by making a decision as to whether the null hypothesis is validated at a predetermined level of statistical significance.

The map correction means 113 includes a parallel roads determination means 121, a traveling link determination means 122, a link position correction implementation decision means 123, a link position correction range determination means 124, and a link position correction means 125.

From the map matching means 112, the parallel roads determination means 121 acquires the estimated position and the estimated azimuth of the vehicle as calculated by the position estimation means 111, the positions, azimuths, and link numbers of a plurality of link candidate points including the first link candidate point, and the road deviation determination result. Then, on the basis of these items of information, the parallel roads determination means 121 decides whether or not the link that corresponds to the first link candidate point and the links that correspond to the other link candidate point or candidate points are roads that extend mutually in parallel (i.e., are mutually parallel roads). And the parallel roads determination means 121 stores the estimated position and the estimated azimuth of the vehicle and the positions, azimuths, and link numbers of those link candidate points that correspond to links for which it has been determined that they are parallel roads.

By obtaining link series in which the links that have been determined by the parallel roads determination means 121 as being parallel roads are associated together into units of roads, the traveling link determination means 122 obtains link series corresponding to those sections of the parallel roads that extend in parallel. For the link series that have been obtained in this manner, the evaluation values of their link candidate points as calculated by the map matching means 112 are compared together, and, on the basis of the results of these comparisons, the traveling link determination means 122 determines one of these link series as being the traveling link series upon which the vehicle is currently traveling, while determining the other link series as being parallel link series that extend parallel to this traveling link series.

Each time the vehicle travel through a predetermined distance, the link position correction implementation decision means 123 calculates the position error of the traveling link series with respect to the estimated position of the vehicle. And, if the result is that the position error for even only one position in the traveling link series is greater than or equal to a predetermined threshold value, then the link position correction implementation decision means 123 decides to implement correction of the link positions for the traveling link series and for the parallel link series. It should be understood that the threshold value that is used in this decision corresponds to a permissible amount for the link position error in map matching.

The link position correction range determination means 124 determines a range that includes the portions in the traveling link series for which the position errors, as calculated by the link position correction implementation decision means 123, exceed the threshold value, and the portions of the parallel link series that correspond to those portions of the traveling link series, as being a first correction range for correcting the link positions on the basis of the traveling track of the vehicle. Moreover, the link position correction range determination means 124 determines a second correction range on the basis of the positions of the nodes that are positioned at the boundary of the first correction range, and on the basis of the position correction amounts for those nodes.

Then, for the first correction range and the second correction range that have been determined by the link position correction range determination means 124, the link position correction means 125 calculates correction amounts for the position of each of the links. And the link position correction means 125 corrects the positions of the links for the parallel roads on the basis of these correction amounts that have been calculated, by correcting the positions of the nodes that are included in the traveling link series and in the parallel link series.

The routing means 115 receives information about the destination from the route search command means 106, and receives the link number of the first link candidate point from the map matching means 112. And the routing means 115 specifies the number of the link that is closest to the destination on the basis of the road information stored in the map information storage means 103, and, on the basis of this link number and the link number of the first link candidate point, finds a plurality of routes that connect between those links. Then, from among these routes that have been found in this manner, the route that satisfies some predetermined condition, for example the route along which the distance is the shortest, is selected as being the route for guidance.

The route guidance means 114 acquires the link number and position of the first link candidate point from the map matching means 112, acquires the link number of the route for guidance from the routing means 115, and acquires information for guidance display and so on from the map information storage means 103. And, when the distance from the position of the first link candidate point to some branch point on the route for guidance where the vehicle should turn to the right or to the left becomes equal to or less than some predetermined distance, then the route guidance means 114 sets a road guidance signal to ON, and sets right or left turn information in a guidance direction signal that specifies the direction for guidance. And the route guidance means 114 sends guidance information including the guidance direction signal, the guidance display, the road guidance signal and so on to the screen and audio output means 105.

Next, the operating procedure of the car navigation apparatus of FIG. 1 described above will be explained using the flow chart shown in FIG. 2.

In a step 201, the reception means 101 receives the signals that have arrived from the positioning satellites (i.e. the positioning signals) with its antenna, and, using the functions described above, along with detecting navigation messages that include track information for the positioning satellites, information about the transmission state, ionospheric delay calculation parameters and so on, also measures observational data such as the time points of reception, the pseudo-ranges, the Doppler frequencies, the signal strengths, and so on. And the reception means 101 calculates the positions of the positioning satellites on the basis of the time points of reception and the track information, and calculates the position at reception on the basis of the positions of the positioning satellites and their pseudo-ranges. Moreover, along with calculating the speeds of the positioning satellites from the positions of the positioning satellites in the vicinity of the time instant of reception on the basis of the track information, the reception means 101 also calculates the speed at reception and the azimuth at reception on the basis of the positions and speeds of the positioning satellites and their Doppler frequencies. The position at reception, the speed at reception, and the azimuth at reception that have been calculated in this manner are sent to the position estimation means 111.

Then, in a step 202, the sensor means 102 measures the number of vehicle speed pulses that are outputted along with the rotation of a wheel axle of the subject vehicle, multiplies this number of pulses by a predetermined coefficient of the speed sensor, and thereby calculates the vehicle speed (i.e. the sensed speed). Moreover, the sensor means 102 outputs a signal that corresponds to the angular velocity of the subject vehicle, subtracts a biasing amount of the angular velocity sensor from this output value, multiplies the resulting value by a predetermined coefficient of the angular velocity sensor, and thereby calculates the vehicle angular velocity (i.e. the sensed angular velocity). Yet further, the sensor means 102 outputs a signal that corresponds to the acceleration of the subject vehicle, subtracts a biasing amount of the acceleration sensor from this output value, and thereby calculates the vehicle acceleration (i.e. the sensed acceleration). The sensed speed, the sensed angular velocity, and the sensed acceleration that have been calculated in this manner are sent to the position estimation means 111.

Then, in a step 203, the position estimation means 111 receives the position at reception, the speed at reception, and the azimuth at reception from the reception means 101, receives the sensed speed, the sensed angular velocity, and the sensed acceleration from the sensor means 102, and performs position estimation processing on the basis thereof according to the following operating procedure.

In this position estimation processing operating procedure, the position estimation means 111 takes the position of the subject vehicle, its speed in the direction of progression, its acceleration in the direction of progression, its azimuth, its angular velocity of azimuth, and its pitch angle as state values, and sets up the state equation (continuous type) given by Equation 1 below. It should be understood that, in Equation 1, the acceleration and the angular velocity are subjected to a Markov process of order 1.

In Equation 1, $x(t)$, $y(t)$, and $z(t)$ respectively denote the positions of the subject vehicle in the longitude direction, in the latitude direction, and in the height direction, $v(t)$ denotes its speed in the direction of progression, $a(t)$ denotes its acceleration in the direction of progression, $\theta(t)$ denotes its azimuth, $\omega(t)$ denotes the angular velocity of azimuth, and $\phi(t)$ denotes its pitch angle. Moreover, $\theta p$ denotes the forecast value of the azimuth, $\phi p$ denotes the forecast value of the pitch angle, $\alpha a$ denotes the reciprocal of the decay time constant of the acceleration, $\alpha \omega$ denotes the reciprocal of the decay time constant of the rate of azimuth change, $\sigma a$, $\sigma \omega$, and $\sigma \phi$ respectively denote the standard deviations of the acceleration, of the rate of azimuth change, and of the pitch angle, $w(t)$ denotes white noise having average 0 and standard deviation 1, and $\eta(t)$ denotes the state value vector.

Furthermore, in the operating procedure for position estimation processing, the sensed speed, the sensed angular velocity, the sensed acceleration, the position at reception, the speed at reception, and the azimuth at reception are taken as observed values, and the observation equation (continuous type) given by Equation 2 below is set up.

In Equation 2, $vs(t)$ denotes the sensed speed, $gs(t)$ denotes the sensed acceleration, $\omega s(t)$ denotes the sensed angular velocity, $xr(t)$, $yr(t)$, and $zr(t)$ respectively denote the positions at reception in the longitude direction, in the latitude direction, and in the height direction, $vr(t)$ denotes the speed at reception, $\theta r(t)$ denotes the azimuth at reception, g denotes the acceleration of gravity, $\epsilon(t)$ denotes the observation noise vector, and $y(t)$ denotes the observed value vector. Moreover, $\theta p(t)$ and $\phi p(t)$ are values that are obtained from a forecast value vector that is calculated with Equation 5.

$$\begin{bmatrix} \dot{x}(t) \\ \dot{y}(t) \\ \dot{z}(t) \\ \dot{v}(t) \\ \dot{a}(t) \\ \dot{\theta}(t) \\ \dot{\omega}(t) \\ \dot{\phi}(t) \end{bmatrix} = \begin{bmatrix} 0 & 0 & 0 & \cos\theta p & 0 & 0 & 0 & 0 \\ 0 & 0 & 0 & \sin\theta p & 0 & 0 & 0 & 0 \\ 0 & 0 & 0 & \sin\phi p & 0 & 0 & 0 & 0 \\ 0 & 0 & 0 & 0 & 1 & 0 & 0 & 0 \\ 0 & 0 & 0 & 0 & -\alpha a & 0 & 0 & 0 \\ 0 & 0 & 0 & 0 & 0 & 0 & 1 & 0 \\ 0 & 0 & 0 & 0 & 0 & 0 & -\alpha\omega & 0 \\ 0 & 0 & 0 & 0 & 0 & 0 & 0 & 0 \end{bmatrix} \begin{bmatrix} x(t) \\ y(t) \\ z(t) \\ v(t) \\ a(t) \\ \theta(t) \\ \omega(t) \\ \phi(t) \end{bmatrix} + \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & \sigma a & 0 & 0 & 0 \\ 0 & 0 & 0 & 0 & 0 & 0 & 0 & 0 \\ 0 & 0 & 0 & 0 & 0 & 0 & \sigma\omega & 0 \\ 0 & 0 & 0 & 0 & 0 & 0 & 0 & \sigma\phi \end{bmatrix} w(t) \quad \text{(Equation 1)}$$

$$\dot{\eta}(t) = F\eta(t) + Gw(t)$$

$$\begin{bmatrix} vs(t) \\ gs(t) \\ \omega s(t) \\ xr(t) \\ yr(t) \\ zr(t) \\ vr(t) \\ \theta r(t) \end{bmatrix} = \begin{bmatrix} 0 & 0 & 0 & 1 & 0 & 0 & 0 & 0 \\ 0 & 0 & 0 & 0 & 0 & 0 & 0 & -g\sin\phi p \\ 0 & 0 & 0 & 0 & 0 & 0 & 1 & 0 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \end{bmatrix} \begin{bmatrix} x(t) \\ y(t) \\ z(t) \\ v(t) \\ a(t) \\ \theta(t) \\ \omega(t) \\ \phi(t) \end{bmatrix} + \varepsilon(t) \quad \text{(Equation 2)}$$

$$y(t) = H\eta(t) + \varepsilon(t)$$

When the position at reception, the speed at reception, and the azimuth at reception are outputted from the reception means 101, the position estimation means 111 calculates the estimated position, the estimated speed, the estimated acceleration, the estimated azimuth, the estimated angular velocity, and the estimated pitch angle using Equations 3 through 7 described below. By using Equations 3 through 7, it is possible to perform calculation using a Kalman filter.

In Equations 3 through 7, K(k) denotes the Kalman gain matrix, and R denotes the observation noise covariance matrix. Moreover, η(k|k) denotes the estimated value vector, η(k+1|k) denotes the forecast value vector, and P(k|k) and P(k|k−1) respectively denote the η(k|k) and the η(k|k−1) estimated error covariance matrices. Furthermore, Φ (Δt, αa, αω) denotes the state transition matrix, Δt denotes the sampling interval, Q(k) denotes the process noise covariance matrix, and k denotes the discrete time.

$$K(k)=P(k|k|1)H^T(k)[H(k)P(k|k-1)H^T(k)+R]^{-1} \quad \text{(Equation 3)}$$

$$\eta(k|k)=\eta(k|k-1)+K(k)[y(k)-H\eta(k|k-1)] \quad \text{(Equation 4)}$$

$$\eta(k+1|k)=\Phi(\Delta t,\alpha a,\alpha\omega)\eta(k|k) \quad \text{(Equation 5)}$$

$$P(k|k)=P(k|k-1)-K(k)H(k)P(k|k-1) \quad \text{(Equation 6)}$$

$$P(k|k-1)=\Phi(\Delta t,\alpha a,\alpha\omega)P(k|k-1)\Phi^T(\Delta t,\alpha a,\alpha\omega)+Q(k) \quad \text{(Equation 7)}$$

On the other hand, if the position at reception, the speed at reception, and the azimuth at reception are not outputted from the reception means 101, then the position estimation means 111 deletes the elements that respectively correspond to the position at reception, the speed at reception, and the azimuth at reception from the observed value vector y, from the matrix H, and from the observation noise covariance matrix R in Equations 3 through 7 above.

The position estimation means 111 performs position estimation processing according to the procedure explained above, and the estimated position, the estimated azimuth, and the estimated speed that have been obtained by doing this, and also the estimated error covariance of the position and the azimuth, are sent to the map matching means 112.

Then, in a step 204, the map matching means 112 performs map matching processing according to a procedure such as the following.

In this map matching processing, first, road information such as the numbers of the nodes, the positions of the nodes, the numbers of the links, their start point node numbers, their end point node numbers, their widths, and so on is read in from the map information storage means 103. Moreover, the numbers of nodes and the position correction amounts for those nodes are read in from the map correction amount storage means 104. And, in relation to those nodes for which position correction amounts are set, their node positions are corrected by adding those position correction amounts to their node positions that were read in from the map information storage means 103.

Next, link candidate points are obtained for each of the links around the estimated position by a method such as that previously described, and the covariance of the position error of each of these link candidate points is calculated on the basis of the link azimuth of that link candidate point and a predetermined position error for that link. And an evaluation value for each of the link candidate points is calculated on the basis of the covariances of the position errors of the link candidate points that have been calculated, a predetermined dispersion of azimuth errors, the positions and the azimuths of the link candidate points, the estimated position and the estimated azimuth, and the covariance of their errors. And the link candidate point that has the evaluation value for which, from the result of these calculations, the probability is highest that the vehicle is traveling along its road, is determined as being the first link candidate point.

Furthermore, on the basis of the position and azimuth of the link, their error dispersions, the width information, the estimated position and the estimated azimuth, and their error covariances, a decision is made as to whether the subject vehicle is deviating from that road.

As the results of the map matching processing as explained above, the map matching means 112 sends the estimated position, the estimated azimuth, the position of the first link candidate point and its azimuth and link number, and the road deviation determination result to the routing means 115, to the route guidance means 114, and to the screen and audio output means 105. Moreover, the map matching means 112 sends to the map correction means 113 the estimated position, the estimated azimuth, the positions, the azimuths, the evaluation values, and the link numbers of the plurality of link candidate points including the first link candidate point, and the road deviation determination result.

It should be understood that the map matching processing of the step 204 as explained above will be subsequently explained in detail with reference to FIG. 3.

In a step 205, the map correction means 113 performs correction of the link positions according to a procedure such as the following.

In this link position correction, first, road information such as node numbers, node positions, link numbers, start point node numbers, end point node numbers, widths, and so on is read in from the map information storage means 103 by the parallel roads determination means 121. Moreover, the parallel roads determination means 121 receives the estimated position, the estimated azimuth, the positions, the azimuths, the evaluation values, and the link numbers of the plurality of link candidate points including the first link candidate point, and the road deviation determination result from the map matching means 112. And, from among the links that correspond to the link candidate points, the parallel roads determination means 121 determines the links of parallel roads that extend mutually parallel to one another, and thus detects sections that extend in parallel.

Next, the link series that correspond to the sections of the parallel roads that extend in parallel are obtained by the traveling link determination means 122, and for each of these link series a decision is made, on the basis of the estimated position and the estimated azimuth of the vehicle (i.e. its traveling track) each time the vehicle traverses a certain predetermined distance, as to which this link series is either the traveling link series or a parallel link series. Or, alternatively, it may be decided that this link series is either the traveling link series or a parallel link series, on the basis of the links for the road that the vehicle is traveling upon, these being obtained from the traveling position designation means 107.

Next, on the basis of the traveling track of the vehicle, the position error for the traveling link series is calculated by the link position correction implementation decision means 123. And, if this position error that has been calculated is greater than a threshold value, then the decision means 123 makes the decision that correction of the link positions is to be implemented.

If the result of the decision described above is that correction of the link positions is to be implemented, then a first correction range and a second correction range are determined by the link position correction range determination means 124 on the basis of the traveling track of the vehicle.

Next, the positions of the links of the traveling link series and the parallel link series are corrected by the link position correction means 125. At this time, in the first correction range, a vector is calculated from the traveling link series to the traveling track of the vehicle, and the position of each of the links is corrected by applying this vector as a position correction amount for each of the nodes in the traveling link series and the parallel link series. Moreover, in the second correction range, the position of each of the nodes in the traveling link series and the parallel link series is corrected so that the azimuth error of each of the links becomes no greater than a certain predetermined permissible amount.

It should be understood that the correction of the link positions performed in the step 205 described above will be subsequently explained in detail with reference to FIGS. 5 and 6.

In a step 206, the presence or absence of route search input is decided upon. If input of a destination from the user to the route search command means 106 has taken place, then it is determined that route search input is present, and the flow of control is transferred to a step 209. At this time, the route search command means 106 sends this destination information to the routing means 115. On the other hand, if no destination input is present, then the flow of control proceeds to a step 207.

In a step 207, the presence or absence of a route for guidance is decided upon. If a route for guidance is present, then the flow of control proceeds to a step 208. But if this is not the case, then the flow of control is transferred to a step 211.

In the step 208, a decision is made as to whether or not the subject vehicle is upon the route for guidance. If the link that corresponds to the first link candidate point is included in the links of the route for guidance, then it is decided that the subject vehicle is upon the route for guidance, and the flow of control is transferred to a step 210. On the other hand, if the link that corresponds to the first link candidate point is not included in the links of the route for guidance, then it is decided that the subject vehicle is not upon the route for guidance, and the flow of control is transferred to the step 209.

In the step 209, the routing means 115 reads in road information for the vicinity of the destination from the map information storage means 103, calculates the distance from the destination to each link around it, and takes the link number for which this distance is the closest as being the link of the destination. And the routing means 115 receives the link number, the position, and the azimuth of the first link candidate point from the map matching means 112, finds a plurality of routes that connect from the link of this first link candidate point along this azimuth to the link of the destination, and, from among these routes, takes the route that satisfies some predetermined condition, such as for example being the route along which the distance is the shortest, as being the route for guidance. When the route for guidance has been determined in this manner, the routing means 115 sends the numbers of the links upon this route for guidance to the route guidance means 114.

In the step 210, the route guidance means 114 receives the numbers of the links upon the route for guidance from the routing means 115, and receives, from the map matching means 112, the position, the azimuth and the link number of the first link candidate point, and the road deviation determination result. Moreover, the route guidance means 114 reads in information for guidance display and so on, corresponding to the links upon the route for guidance, from the map information storage means 103.

If the road deviation determination result from the map matching means 112 is that the vehicle is traveling upon a road, then the route guidance means 114 sets the road guidance signal to ON when the distance from the position of the first link candidate point to a point at which the vehicle should turn to the right or to the left has become less than or equal to some predetermined distance, and determines upon a guidance direction signal that specifies the direction for guidance. But if this is not the case, then the route guidance means 114 sets the road guidance signal to OFF. When the road guidance signal is ON, the route guidance means 114 sends information such as a guidance direction signal, a guidance display, guidance about lanes and so on to the screen and audio output means 105.

In the step 211, the screen and audio output means 105 reads in road information such as node numbers, node positions, link numbers, widths and so on from the map information storage means 103. Moreover, it reads in node numbers and position correction amounts for those nodes from the map correction amount storage means 104. And the screen and audio output means 105 draws and displays a road map of the surroundings of the vehicle. At this time, for those nodes for which position correction amounts are set, these position correction amounts are added to the positions of those nodes that were read in from the map information storage means 103, and then the road map is drawn by drawing the links after the positions of the nodes have been thus corrected.

Furthermore, the screen and audio output means 105 receives the estimated position, the estimated azimuth, the position, the azimuth and the link number of the first link candidate point, and the road deviation determination result from the map matching means 112. And, if the road deviation determination result is that the vehicle is traveling upon the road, then the screen and audio output means 105 draws the position and the azimuth of the first link candidate point upon the road map as a car mark. On the other hand, if the road deviation determination result is that the vehicle is deviating from the road, then the screen and audio output means 105 draws the estimated position and the estimated azimuth of the vehicle as a car mark.

Furthermore, the screen and audio output means 105 acquires the guidance direction signal, the guidance display, and the road guidance signal from the route guidance means 114. And, if the road guidance signal is ON, then the guidance display is outputted, and an image and/or audio are outputted in order to notify the direction for guidance to the user.

Next, a detailed explanation of the map matching processing of the step 204 of FIG. 2 will be provided in the following with reference to FIG. 3. When the map matching processing of the step 204 is started, initially a step 301 of FIG. 3 is executed.

In the step 301, the map matching means 112 makes a decision as to whether or not road information has already been acquired in the past. If road information has been read in and acquired from the map information storage means 103 in the past, then the flow of control proceeds to a step 302. But if this is not the case, then the flow of control is transferred to a step 303.

Figure 2:
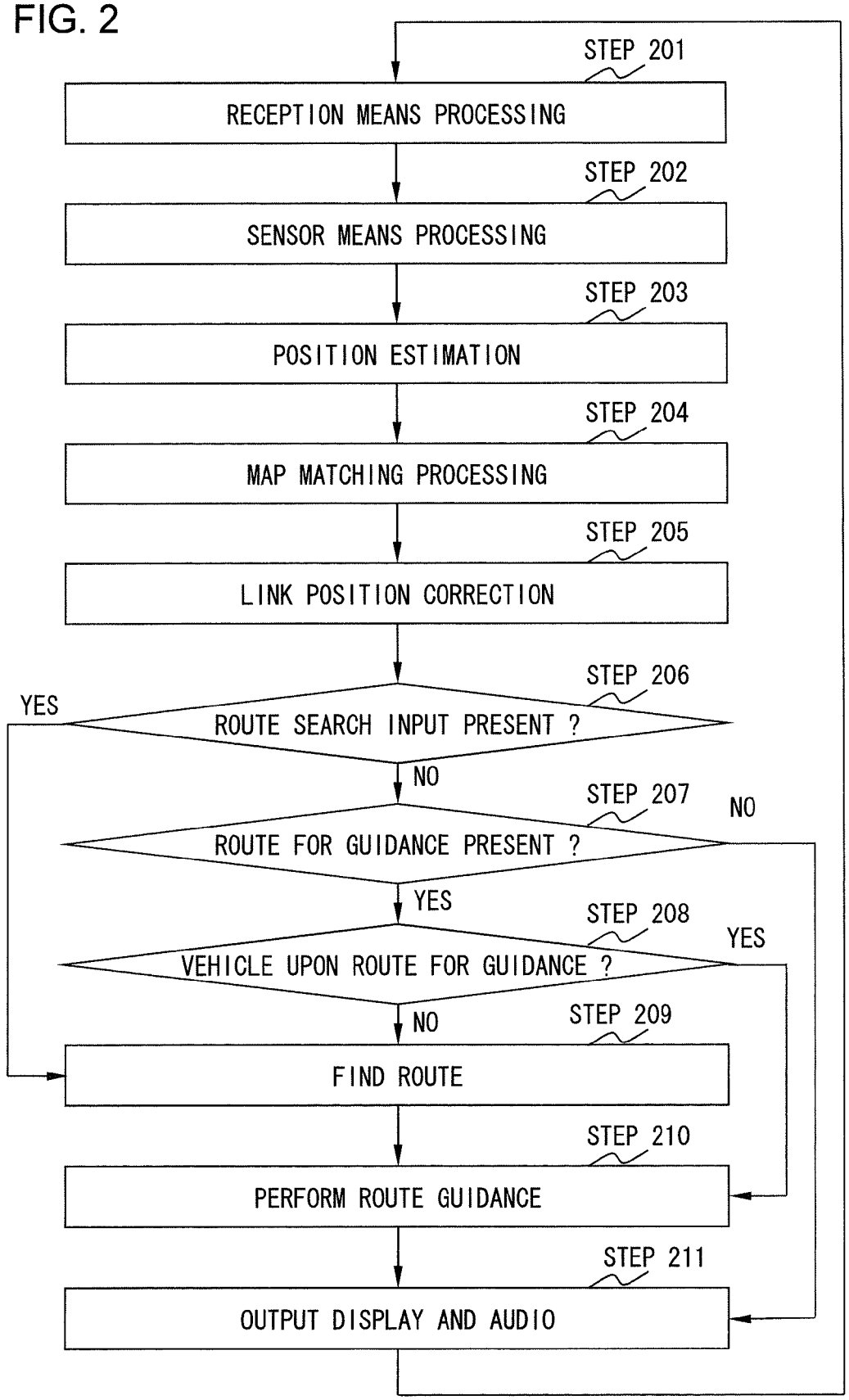
FIG. 2 is a figure showing an operating procedure of this car navigation apparatus.
Figure 4:
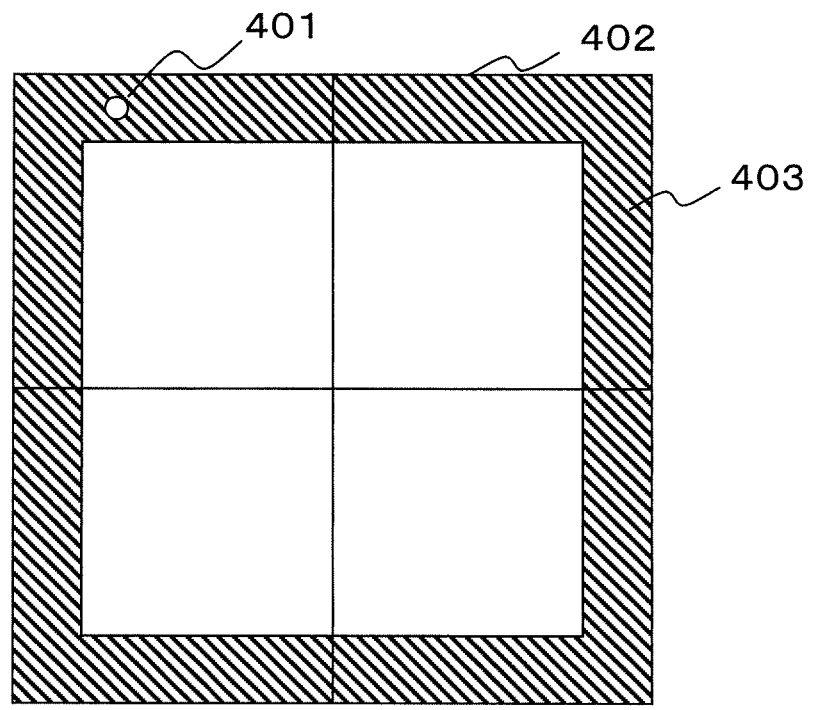
FIG. 4 is a figure showing an example in which the distance between an estimated position and the edge of a mesh region of map data that has been read in in the past is less than or equal to a threshold value.

In the step 302, the map matching means 112 makes a decision as to whether or not the distance between the estimated position sent from the position estimation means 111 in the step 203 of FIG. 2, and the edge of the road information mesh region that was read in in the past, is less than or equal to a predetermined threshold value. If for example, as shown in FIG. 4, the distance between the estimated position 401 and one of the four edges of the mesh region 402 for which road information has been read in in the past is shorter than a certain predetermined distance, so that the estimated position 401 is included within the region 403 shown by sloping hatching that is proximate to the four edges of the mesh region 402, then the flow of control proceeds to the step 303. But if this is not the case, then the flow of control is transferred to a step 304.

In the step 303, for the mesh region that includes the estimated position and a predetermined number of mesh regions that are close to the estimated position, for example three, the map matching means 112 reads in and acquires road information from the map information storage means 103. Here, road information such as node numbers, node positions, link numbers, start point node numbers, end point node numbers, road widths and so on is acquired from the map information storage means 103. Moreover, the map matching means 112 reads in and acquires node numbers and position correction amounts for those nodes from the map correction amount storage means 104. It should be understood that, for mesh regions for which road information or node position correction amounts have already been acquired, there is no need to acquire data for a second time.

In the step 304, the map matching means 112 makes a decision as to whether or not there are link candidate points that have been obtained by the previous cycle of processing. If there are link candidate points that were obtained by the previous cycle of processing, then the flow of control is transferred to a step 306. But if there are no such link candidate points, then the flow of control proceeds to a step 305.

In the step 305, the map matching means 112 receives from the position estimation means 111 the estimated position, the estimated azimuth, the estimated speed, and the error covariances of the estimated position and the estimated azimuth, that were obtained in the step 203 of FIG. 2. And it calculates the distance between the estimated position and all of the links within the mesh region that includes the estimated position, and selects a predetermined number of links in order of shortness of this distance. At this time, the map matching means 112 specifies the nodes whose positions have been corrected on the basis of the node numbers and the node position correction amounts that have been acquired from the map correction amount storage means 104, and calculates the distances between the links that include these nodes and the estimated position after having corrected the positions of these nodes. A respective link candidate point is then generated for each of the links that have been selected in this manner. Here, the foot of a perpendicular line dropped from the estimated position to each link that has been selected is taken as being its link candidate point.

After having generated the link candidate points as described above, the map matching means 112 then sets an azimuth for each link candidate point. Here, for each of the link candidate points, among the two link azimuths in mutually opposite directions that specify the two opposite directions of progression along the link in which this link candidate point is present, that link azimuth in the direction for which the difference from the estimated azimuth received from the position estimation means 111 becomes 90° or less is set as the azimuth of that link candidate point. It should be understood that this procedure is not considered as being limitative in the case of a link having information included in the road information to the effect that this link is a one way road, but rather the azimuth for that link candidate point is set in the direction of one way progression. When this step 305 has been executed, the flow of control is transferred to a step 308.

In the step 306, the map matching means 112 obtains from the position estimation means 111 the estimated position, the estimated azimuth, the estimated speed, and the error covariances of the estimated position and the estimated azimuth that were obtained in the step 203 of FIG. 2. And the map matching means 112 calculates the distance traveled by multiplying the estimated speed by the predetermined period of one processing cycle, and shifts the position of each of the link candidate points that was obtained by the previous processing cycle forward by just this distance traveled that has been calculated. At this time, these positions are shifted along the links upon which those link candidate points are present.

In the step 307, the map matching means 112 calculates the cumulative distance traveled in this processing cycle by adding the distance traveled that was calculated in the step 306 to the cumulative distance traveled in the previous processing cycle, and then makes a decision as to whether or not this is greater than or equal to some predetermined distance. If the cumulative distance traveled for this processing cycle is greater than or equal to the predetermined distance, then the cumulative distance traveled is set to zero, and the flow of control proceeds to the step 308. But if this is not the case, then the flow of control is transferred to a step 310.

In the step 308, the map matching means 112 performs map matching processing to the links. Here, this map matching processing to the links is performed by obtaining a first link candidate point by a procedure such as explained below.

Initially, for the link candidate points that were generated in the step 305, or for the link candidate points that were shifted forwards in the step 306, the map matching means 112 newly adds to all of the links link candidate points that are within a predetermined distance forward from those link candidate points. Here, each of the link candidate points to be added forward to the links is set by a method similar to that of the step 305.

Next, using Equations 8 through 11 described below, the map matching means 112 calculates an evaluation value T for each of the link candidate points that was generated in the step 305 or for each of the link candidate points that was shifted forwards in the step 306, and for each of the link candidate points that was added as described above. In Equations 8 through 11, $(x_e, y_e)$ denotes the estimated position, $\theta_e$ denotes the estimated azimuth, $(x_l, y_l)$ denotes the position of each of the link candidate points, $\theta_l$ denotes the azimuth of each of the link candidate points, $\Sigma_e$ denotes the error covariance matrix of the estimated position and the estimated azimuth, $\sigma_{pl}$ and $\sigma_{\theta l}$ denote the spreads of the position errors and the azimuth errors of the links set in advance, and n denotes the number of distance series data items. It should be understood that this "distance series data" is data specifying estimated values and link candidate points at other points that are spaced apart at fixed intervals along the direction in which the subject vehicle is traveling.

$$T = \sum_{i=m-n+1}^{m} [\Delta x(i) \ \Delta y(i) \ \Delta\theta(i)] \sum_{d}(i)^{-1} \begin{bmatrix} \Delta x(i) \\ \Delta y(i) \\ \Delta\theta(i) \end{bmatrix} \quad \text{(Equation 8)}$$

$$\begin{bmatrix} \Delta x(i) \\ \Delta y(i) \\ \Delta\theta(i) \end{bmatrix} = \begin{bmatrix} x_e(i) \\ y_e(i) \\ \theta_e(i) \end{bmatrix} - \begin{bmatrix} x_l(i) \\ y_l(i) \\ \theta_l(i) \end{bmatrix} \quad \text{(Equation 9)}$$

$$\sum_{d}(i) = \sum_{e}(i) + \sum_{l}(i) \quad \text{(Equation 10)}$$

$$\sum_{l}(i) = \begin{bmatrix} \sigma_{pl}^2 \sin^2\theta_l(i) & 0 & 0 \\ 0 & \sigma_{pl}^2 \cos^2\theta_l(i) & 0 \\ 0 & 0 & \sigma_{\theta l}^2 \end{bmatrix} \quad \text{(Equation 11)}$$

If the subject vehicle is traveling upon a road, then the position and the azimuth of the link candidate point that corresponds to the subject vehicle should almost agree with its estimated position and its estimated azimuth. Due to this, the smaller the evaluation value T for a link candidate point is, the higher is the probability that the subject vehicle is traveling upon the road that corresponds to that link candidate point. Thus, after having calculated the evaluation value T for each of the link candidate points as described above, the map matching means 112 selects a predetermined number of link candidate points in order of small size of their evaluation values T (i.e. in order of the highest probability of traveling upon a road), and eliminates the information for the other link candidate points. And, from among these link candidate points, that link candidate point for which the evaluation value T is the smallest (i.e. the one for which the probability of traveling upon a road is the highest) is taken as being the first link candidate point. If it is hypothesized that the errors in the estimated position and in the estimated azimuth and the errors in the link positions and in the link azimuths follow normal distributions, then the evaluation values T will be distributed according to a chi squared distribution having 2×n degrees of freedom. Due to this, the integrated value of the probability density function of the chi squared distribution of 2×n degrees of freedom that has a value greater than or equal to the evaluation value T, corresponds to the probability that the vehicle is traveling upon this road.

In the step 309, the map matching means 112 makes a decision as to whether the vehicle is deviating from the road. Here, as described below, taking the link that corresponds to the first link candidate point as subject, the first map matching means 112 poses the hypotheses as to whether or not there is a deviation in distance between the estimated position and the link.

The null hypothesis Hp0: there is no deviation in distance.
The alternative hypothesis Hp1: there is a deviation in distance.

Next, using Equations 12 through 15 below, the map matching means 112 calculates a test statistic $T_p$ in which the distance from the estimated position to the link is made dimensionless. Here, $\Sigma_{pe}$ denotes the error covariance of the estimated position, and $\Sigma_{p1}$ denotes the error covariance of the link positions.

$$T_p = [\Delta x \ \Delta y] \sum_{p}^{-1} \begin{bmatrix} \Delta x \\ \Delta y \end{bmatrix} \quad \text{(Equation 12)}$$

$$\begin{bmatrix} \Delta x \\ \Delta y \end{bmatrix} = \begin{bmatrix} x_e \\ y_e \end{bmatrix} - \begin{bmatrix} x_l \\ y_l \end{bmatrix} \quad \text{(Equation 13)}$$

$$\sum_{p} = \sum_{pe} + \sum_{pl} \quad \text{(Equation 14)}$$

$$\sum_{pl} = \begin{bmatrix} \sigma_{pl}\sin\theta_l & 0 \\ 0 & \sigma_{pl}\cos\theta_l \end{bmatrix} \quad \text{(Equation 15)}$$

If it is hypothesized that the error in the estimated position and the errors in the link positions follow normal distributions, then the test statistic $T_p$ that is calculated as described above will be distributed according to a chi squared distribution having one degree of freedom. Thus, when a statistical significance of α is determined, and a test for the above hypotheses is performed on the basis of a chi squared distribution of one degree of freedom, then the map matching means 112 is able to validate the hypotheses as follows. That is, if the test statistic $T_p$ is less than or equal to the chi squared value of one degree of freedom and statistical significance α, then it is not possible to reject the null hypothesis, so that it is decided that there is no deviation in distance between the estimated position and the link. On the other hand, if the test statistic $T_p$ is larger than the chi squared value of one degree of freedom and statistical significance α, then the null hypothesis must be rejected, so that it is decided that there is a deviation in distance between the estimated position and the link.

Furthermore, as described below, taking the link that corresponds to the first link candidate point as subject, the first map matching means 112 poses the hypotheses as to whether or not there is a deviation between the estimated azimuth and the link azimuth.

The null hypothesis Hθ0: there is no difference between the estimated azimuth and the link azimuth.
The alternative hypothesis Hθ1: there is some difference between the estimated azimuth and the link azimuth.

Next, using Equations 16 through 18 below, the map matching means 112 calculates a test statistic $T_\theta$ in which the difference between the estimated azimuth and the link azimuth is made dimensionless.

$$T_\theta = \frac{\Delta\theta}{\sigma_\theta} \quad \text{(Equation 16)}$$

$$\Delta\theta = \theta_e - \theta_l \quad \text{(Equation 17)}$$

$$\sigma_\theta^2 = \sigma_{\theta e}^2 + \sigma_{\theta l}^2 \quad \text{(Equation 18)}$$

If it is hypothesized that the error in the estimated azimuth and the errors in the link azimuths follow normal distributions, then the test statistic $T_\theta$ will be distributed according to a normal distribution. Thus, when a statistical significance of α is determined, and a two-tail test for the above hypotheses is performed on the basis of a normal distribution, then the map matching means 112 is able to validate the hypotheses as follows. That is, if the absolute value of the test statistic $T_\theta$ is less than or equal to the statistically significant value α/2 of a normal distribution, then it is not possible to reject the null hypothesis, so that it is decided that there is no deviation between the estimated azimuth and the link azimuth. On the other hand, if the absolute value of the test statistic $T_\theta$ is larger than the statistically significant value α/2 of a normal distribution, then the null hypothesis must be rejected, so that it is decided that there is a deviation between the estimated azimuth and the link azimuth.

If it has been decided, according to the decisions made as explained above, that there is no deviation in distance between the estimated position and the link, and also that there is no deviation between the estimated azimuth and the link azimuth, then the map matching means 112 decides that traveling upon a road is taking place, in other words that the subject vehicle is traveling upon a road. But if this is not the case, then the map means 112 decides that road deviation is taking place, in other words that the subject vehicle is deviating from the road.

In the step 310, the map matching means 112 sends the estimated position and the estimated azimuth received from the position estimation means 111, the position, azimuth, and link number of the first link candidate point that were obtained in the step 308, and the result of the road deviation determination that was performed in the step 309, to the routing means 115, to the route guidance means 114, and to the screen and audio output means 105. Moreover, the map matching means 112 sends the estimated position and the estimated azimuth received from the position estimation means 111, the positions, azimuths, evaluation values and link numbers of the link candidate points including the first link candidate point that were obtained in the step 308, and the result of the road deviation determination that was performed in the step 309, to the map correction means 113.

When the step 310 has been executed, the map matching processing of the step 204 of FIG. 2 terminates, and the flow of control proceeds to the step 205. In this map matching processing of the step 204, as explained above, the processing is performed by the map matching means 112.

Next, using FIGS. 5 and 6, a detailed explanation of the correction of the link positions in the step 205 of FIG. 2 will be provided in the following. When the correction of the link positions in the step 205 is started, initially a step 501 of FIG. 5 is executed.

Figure 3:
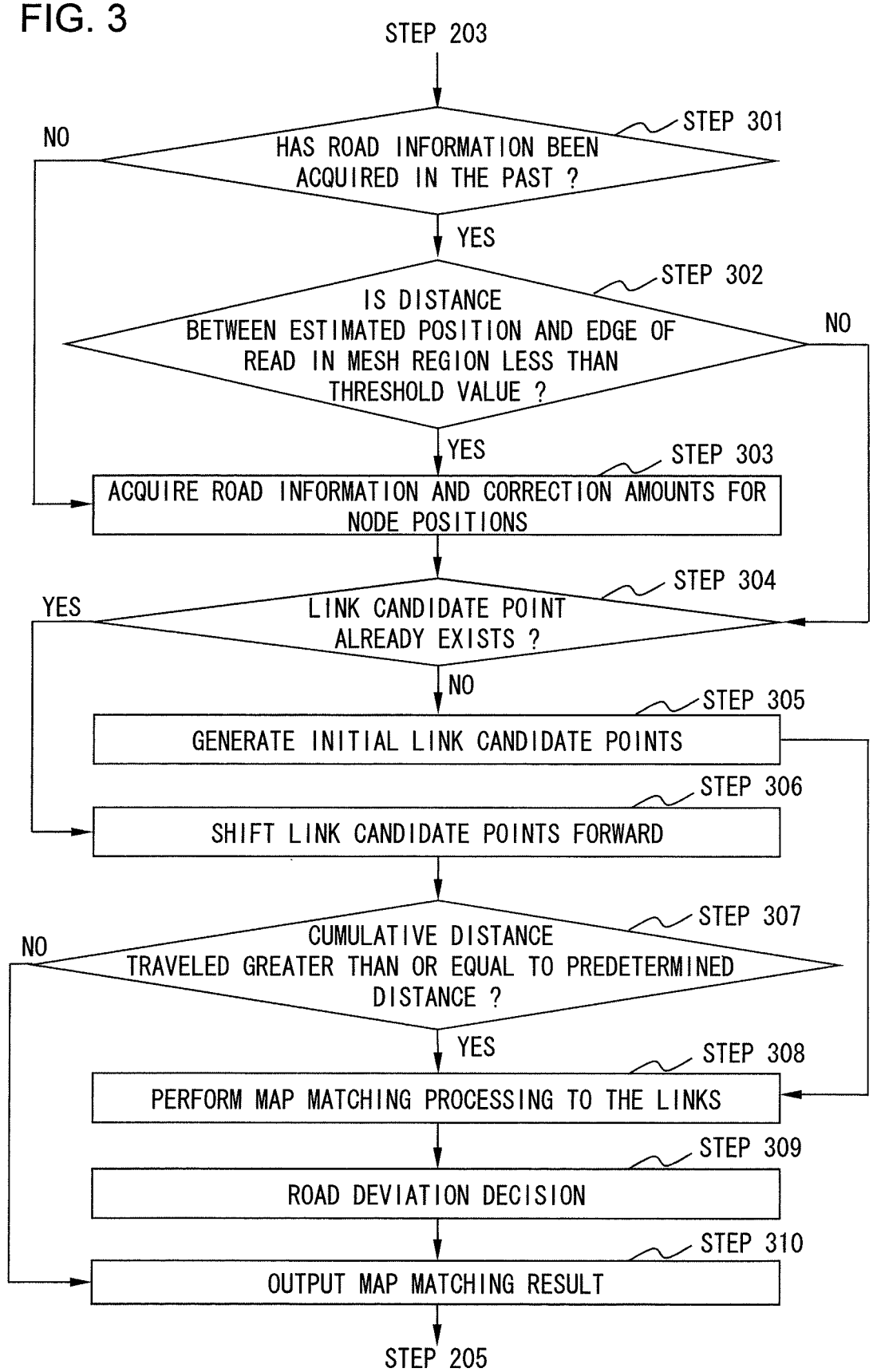
FIG. 3 is a figure showing operation for map matching processing.

In the step 501, if in the step 307 of FIG. 3 it was decided that the cumulative distance traveled is greater than or equal to the predetermined distance, and map matching processing to the links has been implemented in the step 308, then the parallel roads determination means 121 forwards the flow of control to a step 502. But if map matching processing to the links has not been implemented, then correction of the link position in the step 205 of FIG. 2 terminates and the flow of control proceeds to the step 206.

In the step 502, the parallel roads determination means 121 receives the estimated position, the estimated azimuth, the positions, the azimuths, the evaluation values, and the link numbers of the link candidate points including the first link candidate point, and the road deviation determination results that were sent from the map matching means 112 in the step 310 of FIG. 3. And, along with calculating the distances between and the differences in azimuth between the first link candidate point and the other link candidate points, the parallel roads determination means 121 also calculates the angles between the directions from the first link candidate point to each of the other link candidate points, and the azimuth of the first link candidate point.

Then the parallel roads determination means 121 makes a decision as to whether or not, among the other link candidate points for which the distance, azimuth differences, and angles with respect to the first link candidate point have been calculated as described above, there exists any link candidate point whose distance and azimuth difference are both within respective predetermined threshold values, and moreover for which its angle is within a predetermined range from 90°. If a link candidate point that satisfies this type of condition exists, then it is decided that the link that corresponds to the first link candidate point and the link that corresponds to this link candidate point are parallel roads that extend mutually parallel to one another. It should be understood that, if a plurality of link candidate points exist that satisfy the above condition, then it is decided that the links that correspond to those link candidate points and the link that corresponds to the first link candidate point are all mutually parallel roads. On the other hand, if not even one link candidate point exists that satisfies the above condition, then it is decided that none of the links that correspond to the link candidate points are mutually parallel roads.

Figure 7:
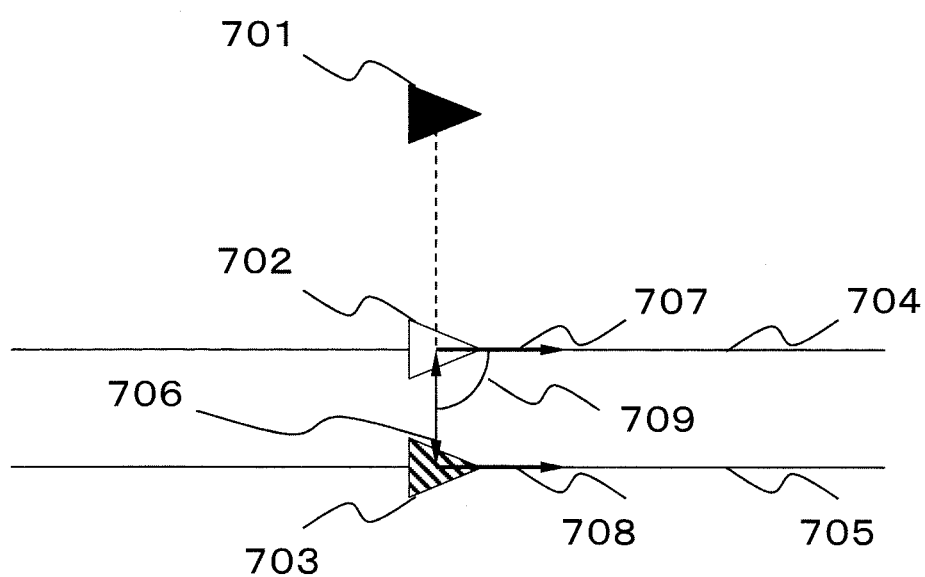
FIG. 7 is a figure showing an example of parallel roads determination.

For example, as shown in FIG. 7, a first link candidate point 702 and a link candidate point 703 are detected by the map matching means 112 by dropping perpendicular lines from the estimated position 701 of the vehicle to each of the links 704 and 705. And let us suppose that the distance 706 between the first link candidate point 702 and the link candidate point 703 is within the predetermined threshold value, and moreover that the azimuth difference between the azimuth 707 of the first link candidate point 702 and the azimuth 708 of the link candidate point 703 is within the predetermined threshold value. Furthermore, it is seen that the angle 709 between the direction from the first link candidate point 702 to the link candidate point 703, and the azimuth 707 of the first link candidate point 702, is almost 90°. In this type of case, by the processing of the step 502, it is possible to decide that the link 704 and the link 705 are parallel roads.

In the step 503, the parallel roads determination means 121 stores the estimated position and the estimated azimuth of the vehicle, the position, the azimuth, the evaluation value, and the link number of the link candidate point that corresponds to each of the links for which it was decided in the step 502 that they are parallel roads, and the road deviation determination result. It should be understood that this information is stored each time the vehicle travels the predetermined distance specified in the step 307 of FIG. 3.

In the step 504, the traveling link determination means 122 makes a decision as to whether or not traveling link information has been inputted from the user to the traveling position designation means 107. If traveling link information has been inputted, then the flow of control proceeds to a step 505, whereas if no such information has been inputted then the flow of control is transferred to a step 506.

In the step 505, the traveling link determination means 122 receives and stores the link number of the road the vehicle is traveling upon that is sent from the traveling position designation means 107, in other words the link number of the road that has been inputted from the user as the traveling link.

In the step 506, on the basis of the information stored in the parallel roads determination means 121, the traveling link determination means 122 makes a decision as to whether or not the link upon which the vehicle is traveling is a parallel road. Here, this decision as to whether or not the link upon which the vehicle is traveling is a parallel road is made by detecting whether it is one of the parallel roads that was detected in the step 503. In other words, if parallel roads have been detected in the step 503, then one among these parallel roads will be the link upon which the vehicle is traveling that corresponds to the first link candidate point. Accordingly, in this case, it is determined that the traveling link is this parallel road, and the correction of link position in the step 205 is terminated and the flow of control proceeds to the step 206. On the other hand, if parallel roads have not been detected in the step 503, then it is decided that the link upon which the vehicle is traveling is not a parallel road, and the flow of control proceeds to a step 507.

In the step 507, the traveling link determination means 122 makes a decision as to whether or not there is a parallel road for which the decision of the traveling link series has not been performed, and the vehicle has left this parallel road. Here, when the processing subsequent to the step 502 of FIGS. 5 and 6 is repeatedly executed each time the vehicle traverses the predetermined distance specified in the step 307 of FIG. 3, it is decided whether or not there is a parallel road for which the decision of the traveling link series has not been performed, and moreover the vehicle has left this parallel road, according to whether or not a parallel road was detected in the step 502 that was executed a predetermined number of processing cycles before the present one, and moreover, in the step 509 that was executed before the previous cycle of the process, it was decided not to be in the traveling link series. In other words, if parallel roads were detected in the step 502 that was executed a predetermined number of processing cycles before the present one, and moreover if in the step 509 that was executed before the previous cycle of processing it was determined that this is not in the traveling link series, then the flow of control proceeds to a step 508. On the other hand, if the decision of the traveling link series has been performed for all parallel roads, in other words if parallel roads were not detected in the step 502 that was executed a predetermined number of processing cycles before the present one, or if in the step 509 that was executed before the previous cycle of processing when parallel roads were detected it was determined that this is already in the traveling link series, then the correction of link positions in the step 205 of FIG. 2 is terminated and the flow of control proceeds to the step 206.

In the step 508, on the basis of the information stored in the parallel roads determination means 121, the traveling link determination means 122 specifies the link numbers of the links that have been determined to be parallel roads. And, on the basis of these specified link numbers, the traveling link determination means 122 specifies starting point nodes that correspond to the start points of the link series constituted by the links that have been determined to be parallel roads and end point nodes that correspond to the end points of these link series, and reads in information giving their respective node numbers and node positions from the map information storage means 103. Due to this, sections extending in parallel in which parallel roads are present are detected, and link series are obtained that correspond to these sections of parallel roads that extend in parallel.

In the step 509, the traveling link determination means 122 determines the traveling link series and the parallel link series. Here, first, the evaluation value for the first link candidate point that was obtained in the step 308 of FIG. 3 and the evaluation value for the link candidate point whose evaluation was the next highest (i.e. the second link candidate point) are compared together. It should be understood that, as previously described, the smaller the evaluation value for a link candidate point is, the higher is the probability that the vehicle is traveling upon the road that corresponds to that link candidate point. In other words, the second link candidate point is the link candidate point whose evaluation value is the smallest, after the evaluation value of the first link candidate point.

If the result of comparison between the evaluation value of the first link candidate point and the evaluation value of the second link candidate point is that the difference between these values is greater than or equal to some predetermined threshold value, then it is decided that the link in which the first link candidate point is present is the link along which the vehicle is traveling. On the other hand, if this evaluation value difference is less than the threshold value, and moreover the link number of the road that is being traveled upon has been acquired from the traveling position designation means 107, then it is decided that the link that corresponds to the above link number is the link along which the vehicle is traveling. It should be understood that, if the evaluation value difference is less than the threshold value, and moreover the link number of the road that is being traveled upon has not been acquired from the traveling position designation means 107, then no decision as to the traveling link series is performed.

And, among the link series for the sections that extend in parallel that were obtained in the step 508, the link series that is connected to the traveling link that has been determined as previously described is taken as being the traveling link series, while the other link series are taken as being parallel link series. At this time, decisions are made as to whether or not the traveling link and the various link series are connected together, on the basis of whether or not the node numbers of any end point of a link of one of the various link series and of the start point of the traveling link are the same. The traveling link determination means 122 performs the determination of the traveling link series and the parallel link series as explained above.

In the step 510, the traveling link determination means 122 makes a decision as to whether or not the traveling link series and the parallel link series were determined in the step 509. If the traveling link series and the parallel link series were determined, then the flow of control proceeds to a step 511. On the other hand, if the traveling link series and the parallel link series were not determined, then the link position correction of the step 205 of FIG. 2 terminates, and the flow of control is transferred to the step 206.

In the step 511, the link position correction implementation decision means 123 calculates the position error of the traveling link series. Here, for each link candidate point upon the traveling link series, the distance is calculated between that point and the estimated position that corresponds to that link candidate point, in other words the estimated position when that link candidate point was obtained. It should be understood that the distance that is calculated here corresponds to the position error of the traveling link series with respect to its estimated positions.

In the step 512, the link position correction implementation decision means 123 makes a decision as to whether to implement link position correction on the basis of the position error of the traveling link series that has been calculated in the step 511. Here, each of the distances that have been calculated as being a position error of the traveling link series with respect to an estimated position is compared with a predetermined threshold value, and if even one of them is greater than the predetermined threshold value, then a decision is made to implement link position correction. On the other hand, if all of the position errors of the traveling link series are less than the predetermined threshold value, then a decision is made not to implement link position correction. It should be understood that, as previously described, the threshold value that is used for this decision corresponds to the permissible value of link position error in map matching.

In the step 513, the link position correction implementation decision means 123 makes a decision as to whether or not it was decided in the step 512 to implement correction of link position. If it was decided to implement link position correction, then the flow of control proceeds to a step 514, whereas if it was decided not to implement link position correction, then the correction of link position in the step 205 of FIG. 2 terminates and the flow of control proceeds to the step 206.

In the step 514, on the basis of the traveling track of the vehicle, the link position correction range determination means 124 determines the first correction range for correction of the link position. Here, a range that includes the portion of the traveling link series in which the position error exceeds the threshold value, and also the corresponding portion of the parallel link series, is determined as being the first correction range. In more concrete terms, among the various links that are included in the traveling link series, one or two or more links are specified that respectively correspond to link candidate points for which, in the step 512, it was determined that the position error was greater than or equal to the threshold value. And a range that includes all of these links and also all of the corresponding links of the parallel link series is specified as being the first correction range.

In the step 515, the link position correction means 125 calculates correction amounts for the node positions for the traveling link series and the parallel link series that, in the step 514, were determined as being within the first correction range. Here, for the links of the traveling link series that are included in the first correction range, the distance between each of the link candidate points upon those links and the estimated position that corresponds to it is calculated. And the average of these distances that have been calculated is obtained, and this is taken as being the position error $e_l$ of that link.

Figure 8:
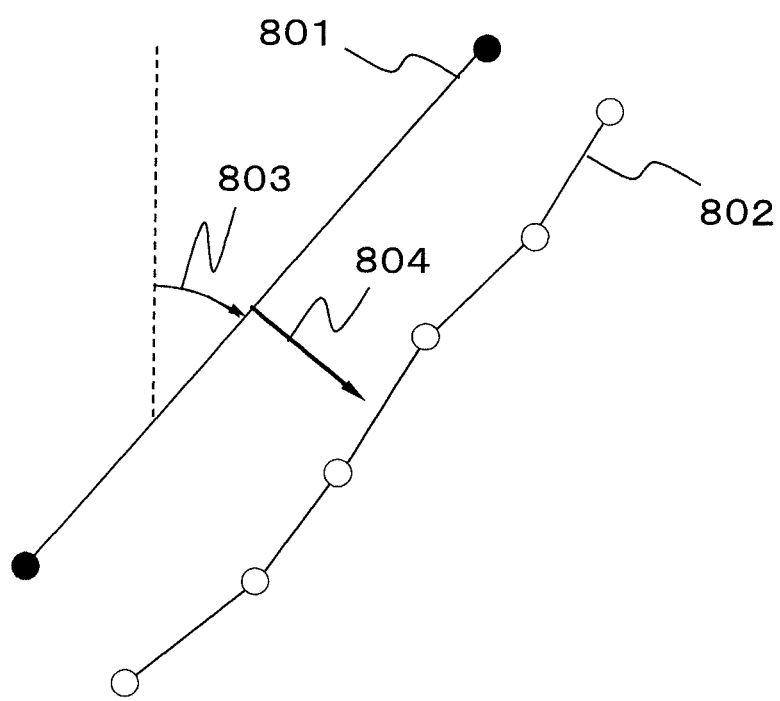
FIG. 8 is a figure showing an example of a method for link azimuth setting.
Figure 9:
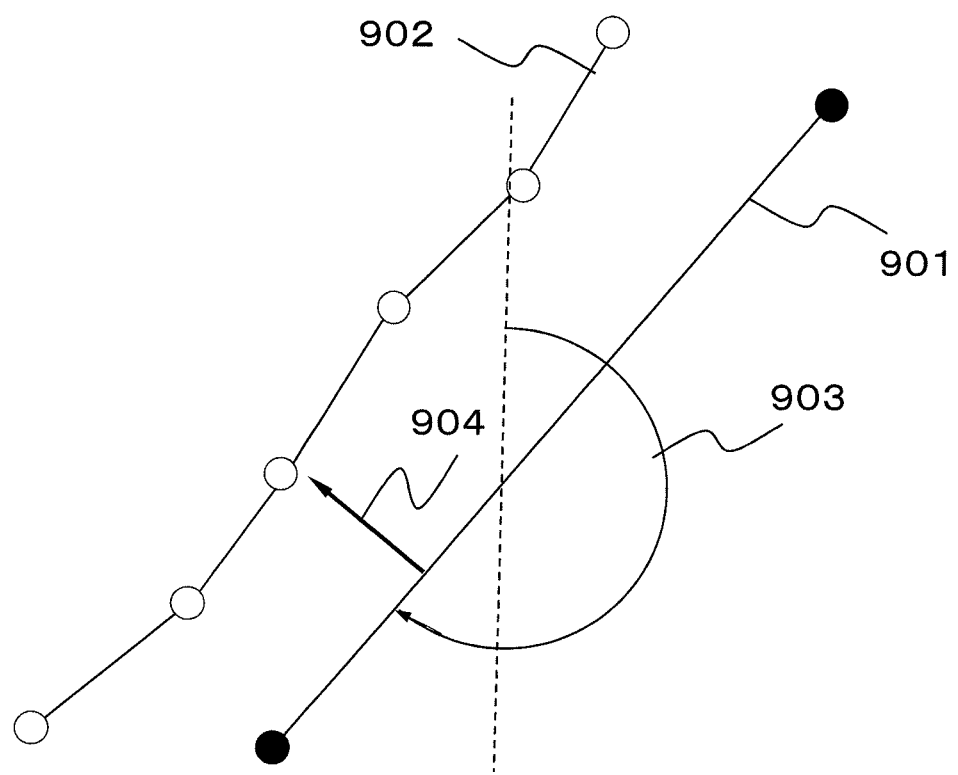
FIG. 9 is a figure showing another example of a method for link azimuth setting.

Next, using Equations 19 and 20 below, position correction amounts ($\Delta x_m$, $\Delta y_m$) are calculated for the nodes included in the traveling link series that are within the first correction range. In Equation 19, $\theta_{l1}$ and $\theta_{l2}$ denote the respective position errors of the two links that are connected to that node, while $\theta_{l1}$ and $\theta_{l2}$ denote the respective azimuths of these two links that are connected to that node. Here, $\theta_{l1}$ and $\theta_{l2}$ are set to match the directions from link candidate points upon those links towards the corresponding estimated position. For example, if the positional relationship of the link 801 in which a link candidate point is present and the traveling track 802 that includes the estimated position is as shown in FIG. 8, then the azimuth of the link 801 is set to match the direction 804 from the link 801 towards the traveling track 802, as shown by the arrow 803. Furthermore, if the positional relationship of the link 901 in which a link candidate point is present and the traveling track 902 that includes the estimated position is as shown in FIG. 9, then the azimuth of the link 901 is set to match the direction 904 from the link 901 towards the traveling track 902, as shown by the arrow 903.

$$\begin{bmatrix} \Delta x_m \\ \Delta y_m \end{bmatrix} = (A_\theta^T A_\theta)^{-1} A_\theta^T \begin{bmatrix} e_{l1} \\ e_{l2} \end{bmatrix} \quad \text{(Equation 19)}$$

$$A_\theta = \begin{bmatrix} \cos\theta_{l1} & -\sin\theta_{l1} \\ \cos\theta_{l2} & -\sin\theta_{l2} \end{bmatrix} \quad \text{(Equation 20)}$$

Next, for each of the nodes in the parallel link series included in the first correction range, on both sides of that node, two nodes are obtained that are within the traveling link series close to that node. In other words, in both the directions of the two links that are connected to that node, the nodes within the traveling link series that are in positions closest to that node are obtained one at a time. And, using Equation 21 below, from the correction amounts for these two nodes, position correction amounts ($\Delta x_{pn}$, $\Delta y_{pn}$) are calculated for the nodes included in the parallel link series that are within the first correction range. In Equation 21, $L_{np1}$ and $L_{np2}$ denote the respective distances from that node to the two nodes within the traveling link series that are close to that node. Due to this, for each of the nodes within the parallel link series as well, it is possible to obtain a position correction amount that is equivalent to those of the nodes within the traveling link series.

$$\begin{cases} \Delta x_{pn} = \dfrac{L_{np2} \Delta x_{m1} + L_{np1} \Delta x_{m2}}{L_{np1} + L_{np2}} \\ \Delta y_{pn} = \dfrac{L_{np2} \Delta y_{m1} + L_{np1} \Delta y_{m2}}{L_{np1} + L_{np2}} \end{cases} \quad \text{(Equation 21)}$$

It should be understood that for a node, among the nodes within the parallel link series, that is upon the boundary of the first correction range, Equation 21 described above is not used, but instead the position correction amount is set to be the same as the position correction amount for a node within the traveling link series that is on the boundary of the first correction range.

In the step 516, the link position correction range determination means 124 determines a second correction range that is in the vicinity of the boundary of the first correction range. Here, first, the distances from the nodes of the traveling link series and the parallel link series that are positioned on the boundary of the first correction range along the links to nodes that are positioned outside the boundary are calculated. And the range in which these distances are less than or equal to a distance $L_m$ that is calculated using Equation 22 described below is taken as being the second correction range. In Equation 22, $e_{bn}$ denotes a value that is obtained by combining the x component $\Delta x_{pnb}$ and the y component $\Delta y_{pnb}$ of the position correction amount of the node in the traveling link series that is at the boundary of the first correction range, in other words denotes the position error of the link within the first correction range that connects to that node, and $\theta_p$ denotes a permissible amount for the azimuth error during map matching.

$$L_m = \frac{e_{bn}}{\tan\theta_p} = \frac{\sqrt{\Delta x_{pnb}^2 + \Delta y_{pnb}^2}}{\tan\theta_p} \quad \text{(Equation 22)}$$

In the step 517, using Equation 23 described below, the link position correction means 125 calculates a position correction amount ($\Delta x_{ns}$, $\Delta y_{ns}$) for each node that is within the second correction range. In Equation 23, $L_{ns}$ denotes the distance along the link from the node that is at the boundary of the first correction range and that node, while $\theta_{lb}$ denotes the azimuth of the link that is at the boundary of the first correction range.

$$\begin{cases} \Delta x_{ns} = \dfrac{L_{ns} e_{bn} \cos\theta_{lb}}{L_m} \\ \Delta y_{ns} = -\dfrac{L_{ns} e_{bn} \sin\theta_{lb}}{L_m} \end{cases} \quad \text{(Equation 23)}$$

In the step 518, the link position correction means 125 stores the position correction amounts for the various nodes and their node numbers that have been respectively calculated in the steps 515 and 517 described above in the map correction amount storage means 104. At this time, as previously described, these items of information are stored in the storage regions for the parcel numbers that correspond to these nodes.

Next, the beneficial effects of the invention of the present application will be explained. With the prior art road data correction method in which the positions of links are corrected using the traveling track of the vehicle, when a parallel road to which a plurality of roads extend mutually adjacent and parallel is taken as being the subject for correction, then only the position of the link upon which the vehicle is traveling is corrected. Due to this there is the problem that in some cases mismatching occurs when the vehicle is next traveling upon this parallel road, and this is undesirable.

Figure 10:
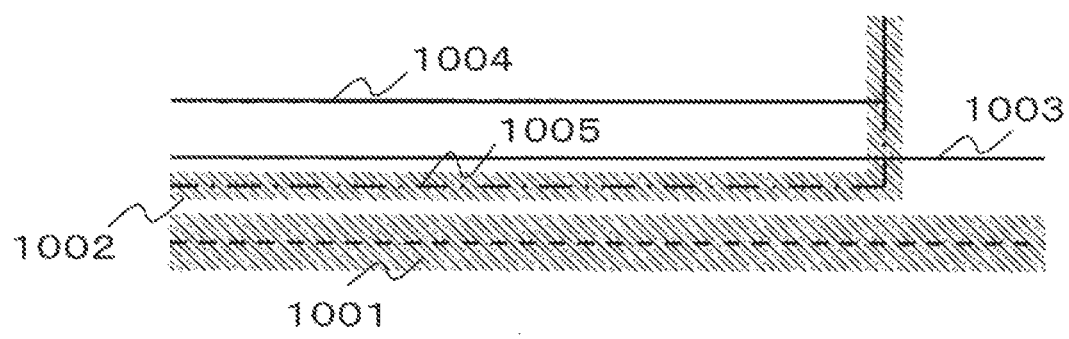
FIG. 10 is a figure showing an example, in the case of parallel roads, of mis-matching to a link position after correction.

This situation will now be explained in the following with reference to FIG. 10. In FIG. 10, an example of a situation is shown in which, with parallel roads in which a main road 1001 and a side road 1002 extend parallel to one another, the positions of links 1003 and 1004 that respectively represent the main road 1001 and the side road 1002 are set so that they are deviated. In this type of case, with the correction method according to the prior art, when the vehicle is traveling upon the side road 1002, the position of the link 1004 is amended after correction to the position of the link 1005. When this is done, the positional relationship of the link 1005 after correction that represents the side road 1002 and of the link 1003 that represents the main road 1001 becomes inverted, and this is undesirable. As a result, when next the vehicle travels along the main road 1001, mis-matching is performed, not to the link 1003, but instead to the link 1005 after correction that represents the side road 1002, and this is undesirable.

By contrast, according to the operating procedure for the car navigation apparatus according to the present invention as explained above, when parallel roads are the subject for correction, correction is performed so as to match the link positions, not only for the link along which the vehicle is traveling, but also for the link or links that extend in parallel therewith. Due to this, it is possible to prevent the occurrence of mis-matching when the vehicle next travels along one of these parallel roads.

Figure 11:
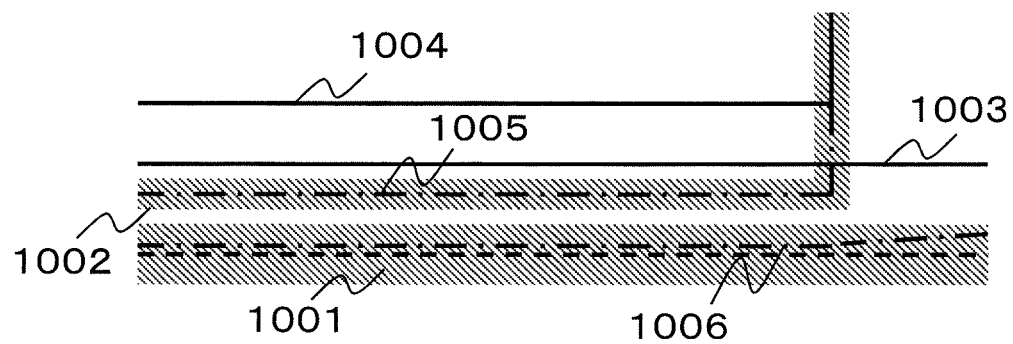
FIG. 11 is a figure showing an example, in the case of parallel roads, of matching to a link position after correction, according to the present invention.

An example of this situation will now be explained in the following with reference to FIG. 11. In FIG. 11, in a similar manner to the case in FIG. 10, an example is shown of a situation in which, with parallel roads of which a main road 1001 and a side road 1002 extend parallel to one another, the positions of links 1003 and 1004 that respectively represent the main road 1001 and the side road 1002 are set so that they are deviated. When the vehicle travels along the side road 1002, as described above, with the present invention, the position error of the link 1004 is calculated on the basis of the traveling track of the vehicle. And, as shown in FIG. 11, along with the position of the link 1004 being amended after correction to the position of the link 1005, also, using an equal position correction amount, the position of the link 1003 is amended after correction to the position of the link 1006. By doing this, the position of the link upon which the vehicle is traveling and the position(s) of link(s) that extend parallel thereto are all corrected by the same correction amount. As a result, when next the vehicle travels along the main road 1001, an accurate matching is made to the position after correction of the link 1006; and, when next the vehicle travels along the side road 1002, an accurate matching is made to the position after correction of the link 1005.

Figure 6:
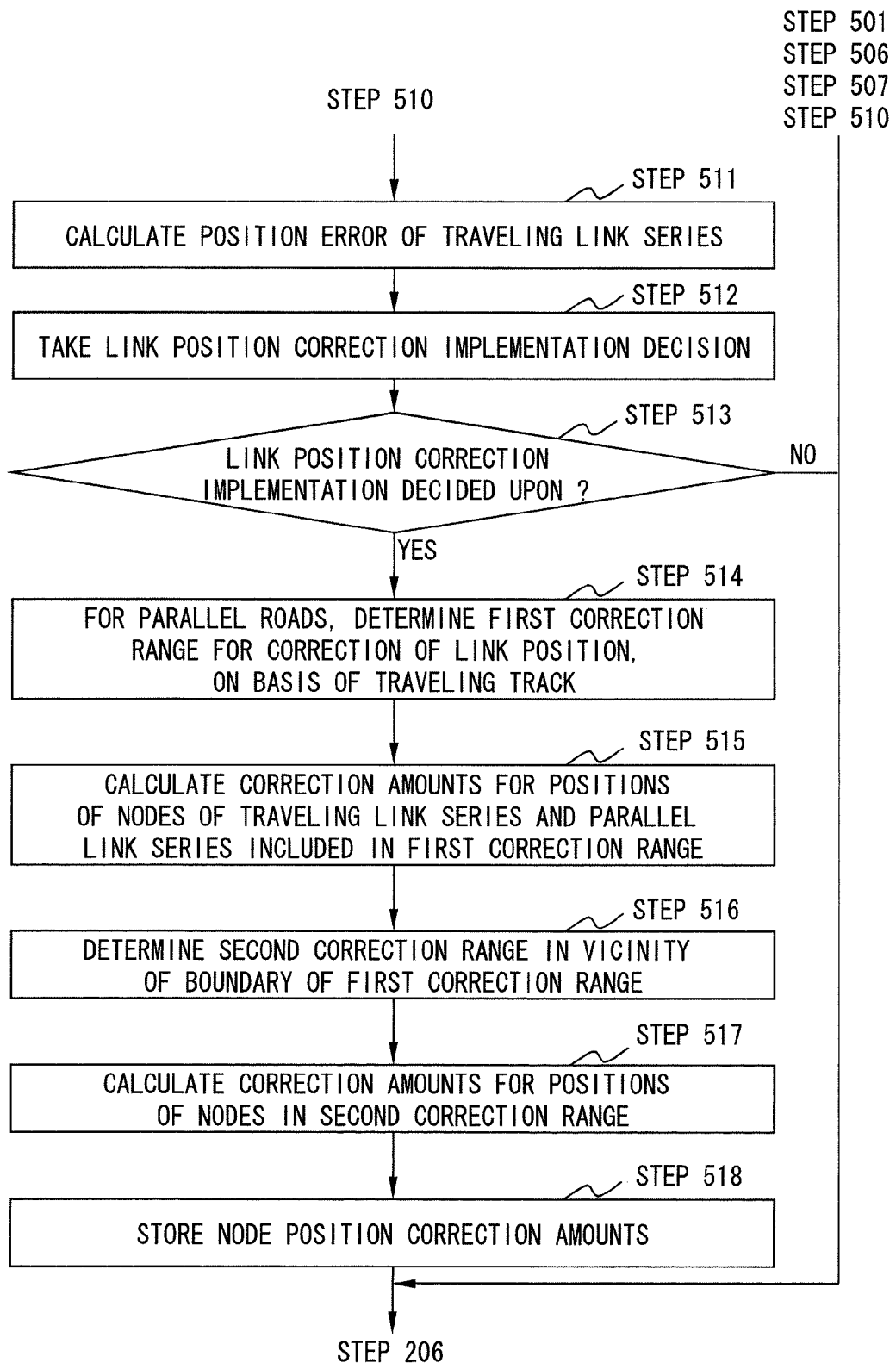
FIG. 6 is a further figure showing operation for link position correction.

Moreover, according to the operating procedure for the car navigation apparatus according to the present invention, in the steps 516 and 517 of FIG. 6, the second correction range is determined for which the position error of the traveling link series is greater than the threshold value and that is outside the first correction range, and the positions of nodes within this second correction range are corrected. Due to this, even though the positions of the links within the first correction range are corrected, still it is possible to reduce the azimuth error that occurs in links that are connected to those links. As a result, it is possible to reduce the negative influence upon the evaluation values in the map matching processing, and it is possible to prevent matching to an erroneous link.

Figure 12:
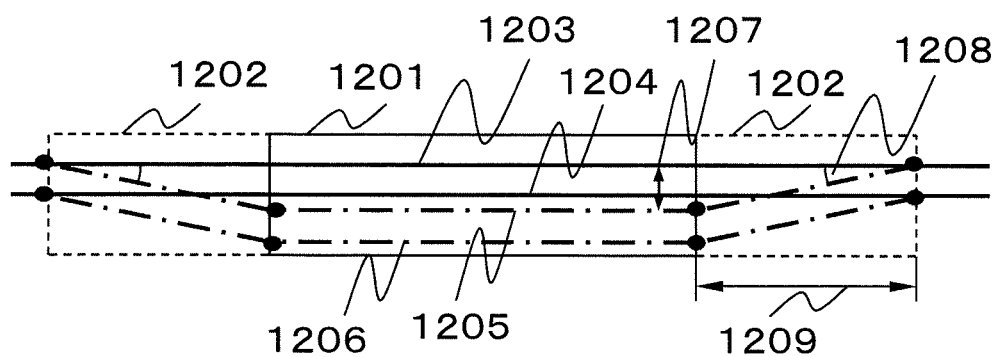
FIG. 12 is a figure showing an example of a first correction range and a second correction range.

An example of this situation will now be explained in the following with reference to FIG. 12. In FIG. 12, an example is shown of a situation in which, with link series 1203 and 1204, a first correction range 1201 and a second correction range 1202 are set, and these link series are respectively amended to the positions after correction of the link series 1205 and 1206. At this time, as shown by Equation 22 as described above, the second correction range 1202 is set as a range that is spaced along the link by just a distance 1209 that is obtained by dividing the node position correction amount 1207 at the boundary of the first correction range 1201 by the tangent of the predetermined permissible azimuth error amount 1208. It should be understood that the permissible azimuth error amount 1208 is the permissible amount of azimuth error during map matching. The second correction range 1202 is set in this manner, and the positions of nodes within this range are corrected. Accordingly, it is possible to keep the azimuth error of each of the links within the second correction range 1202 generated by correcting the link positions within the first correction range 1201, to be less than or equal to the permissible azimuth error amount 1208.

It should be understood that, in FIG. 12, it would also be acceptable to arrange to set the permissible azimuth error amount 1208, not to the permissible amount of azimuth error during map matching, but to the variation of the azimuth errors of links in the road information stored in the map information storage means 103. By doing this, it is also possible to obtain a similar advantageous effect to that described above.

According to the operating procedure for the car navigation apparatus according to the present invention, the decision in the step 512 of FIG. 6 as to whether or not to implement link position correction is performed by comparing the position error of the traveling link series to some predetermined threshold value. And in the step 514 the first correction range is determined on the basis of the result of this decision. As previously described, this threshold value is a value that corresponds to the permissible amount of link position error during map matching. Due to this, it is possible to reduce the position error of the links after correction to the permissible amount for map matching or lower. And, because of this, it is possible to reduce the negative influence upon the evaluation values for map matching processing, and to prevent erroneous matching to links. It should be understood that would also be acceptable to arrange for this threshold value not to be the permissible amount of link position error for map matching, but rather to be set on the basis of the position errors of the links in the road information stored in the map information storage means 103. By doing this, it is also possible to obtain a similar beneficial effect to that described above.

Furthermore, it is possible to set the first correction range in an appropriate manner, since it is arranged for the first correction range to be determined as described above, i.e. without taking all of the traveling link series and the parallel link series as being the first correction range. Accordingly, along with it being possible to shorten the processing time period that is needed for correcting the link positions, also it is possible to reduce the number of nodes for which position correction is performed. As a result, it is possible to keep down the capacity of the map correction amount storage means 104, so that it is possible to reduce the manufacturing cost of this car navigation apparatus.

Figure 5:
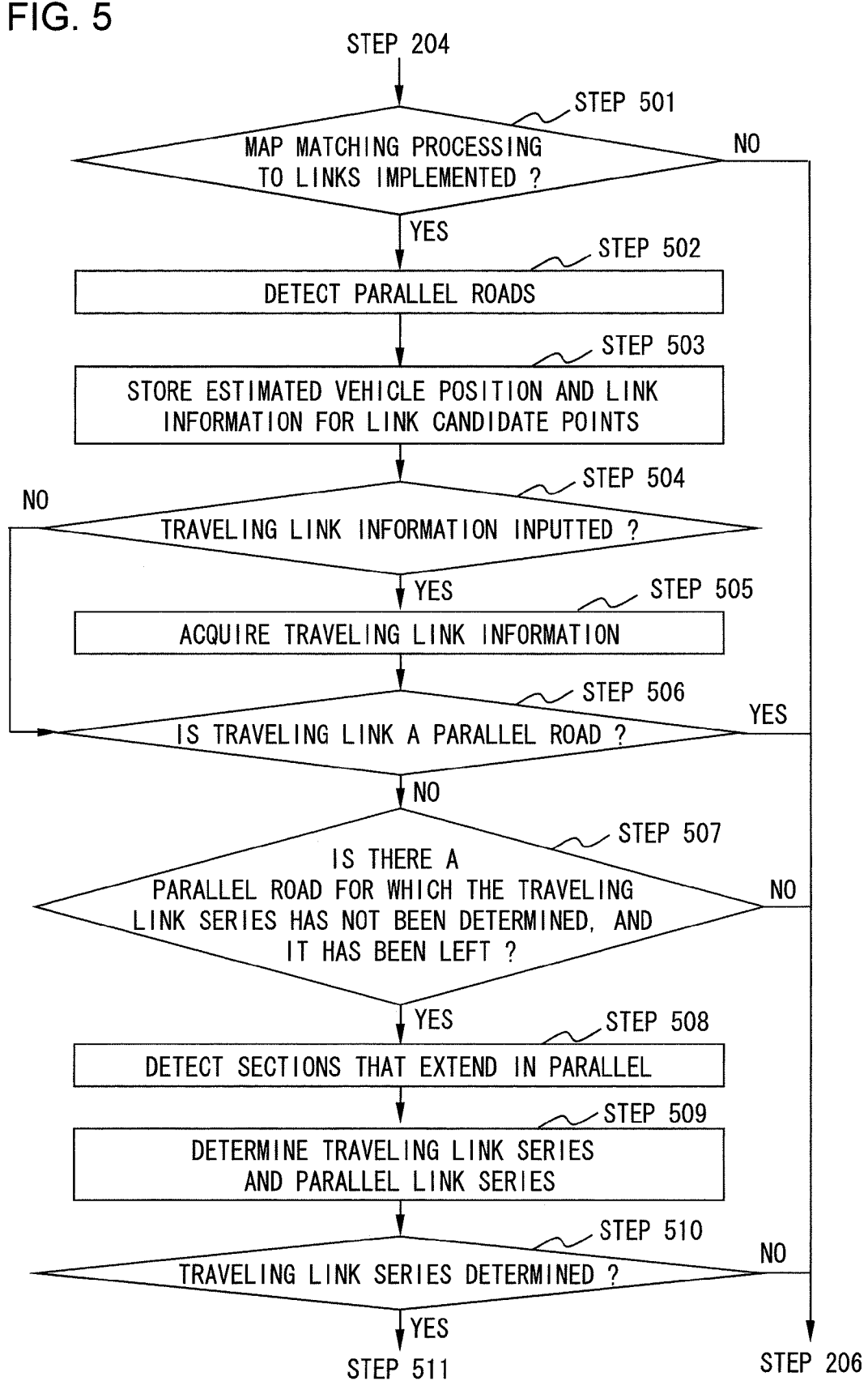
FIG. 5 is a figure showing operation for link position correction.

According to the operating procedure for the car navigation apparatus according to the present invention, when traveling link information has been inputted from the user via the traveling position designation means 107, in the steps 504 and 505 of FIG. 5, the traveling link determination means 122 receives the link number that corresponds to this link. And, in the step 509, the link that corresponds to this link number is determined to be the link upon which the vehicle is traveling. Accordingly, it is possible reliably to correct the position of the link that has been determined to be the traveling link, and it is possible to prevent matching to an erroneous link upon a parallel road.

It should be understood that the car navigation apparatus of the present invention is not to be considered as being limited to the embodiment explained in the above description; it would be possible to implement alterations of various types. In the following, variant embodiments of the car navigation apparatus according to the present invention will be explained.

Variant Embodiment #1

In the embodiment described above, in the step 508 of FIG. 5, the range of the sections that extend in parallel is determined by obtaining link series consisting of links for which it has been determined that they are parallel roads. However, it would also be acceptable to arrange to determine the sections that extend in parallel from a joining point of parallel roads or from a branch point of parallel roads. It is also possible to correct the positions of the traveling link series and the parallel link series in an appropriate manner by doing this, and thereby it is possible to prevent the occurrence of mis-matching when the vehicle next travels upon one of these parallel roads.

Variant Embodiment #2

In the embodiment described above, in the map matching processing to the links that is performed in the step 308 of FIG. 3, the evaluation values T are calculated using Equations 8 through 11 described above. However, it would also be acceptable to arrange to calculate the evaluation values T for the links after correction by using, in Equation 9, the link azimuths before correction, instead of the azimuth $\theta_l$ of each link candidate point. If this is done, then it is possible to reduce the errors in the evaluation values T by eliminating the errors in the link azimuths that are generated by the position correction. As a result, it is possible to prevent matching to erroneous links.

Variant Embodiment #3

In the embodiment described above, when correcting the link positions, as shown in FIG. 12 and described above, for the links that are within the second correction range, azimuth errors are generated corresponding to the permissible azimuth error amount 1208. However, it is possible to arrange to eliminate the azimuth errors in the links due to this type of correction in the following manner.

In the step 518 of FIG. 6, for each of the nodes that is a subject of correction, in addition to the node numbers and the position correction amounts for the nodes as previously described, the link position correction means 125 also stores the types of the correction ranges to which those nodes belong (either the first correction range or the second correction range) in the map correction amount storage means 104. And, when performing the map matching processing to links in the step 308 of FIG. 3, on the basis of these types of correction range, the map matching means 112 determines whether the node whose position was corrected in the step 305 belongs to the first correction range or to the second correction range. In other words, if the position of at least one of the nodes among the nodes at both ends of a link corresponding to a link candidate point for which an evaluation value T is to be calculated has been corrected in the step 305, then it is decided to which of the first correction range and the second correction range this node belongs.

If as a result it is decided that at least one of the nodes belongs to the second correction range, then the evaluation value T is calculated using the link azimuth corresponding to the node position before correction, instead of the azimuth $\theta_l$ of that link candidate point. On the other hand, if it has been decided that the nodes at both ends both belong within the first correction range, then the evaluation value T is calculated using the link azimuth corresponding to the node position after correction, instead of the azimuth $\theta_l$ of that link candidate point. Moreover, in any other case, the link azimuth is calculated from the positions of the nodes represented by the road information that is stored in the map information storage means 103, instead of from the azimuth $\theta_l$ of that link candidate point, and the evaluation value T is calculated using this link azimuth. By doing this, it is possible to reduce the error in the evaluation value T by eliminating the error in the link azimuth that is generated by position correction. As a result, it is possible to prevent matching to an erroneous link.

Variant Embodiment #4

In the embodiment described above, it would also be acceptable to omit the map correction amount storage means 104 of FIG. 1. In this case, in the step 518 of FIG. 6, for each node that is a subject of correction, the link position correction means 125 changes the node position that is stored in the map information storage means 103 to the node position after correction. It is possible to obtain a similar beneficial operational effect as in the embodiments described above by doing this. Moreover, it is possible to reduce the cost of this car navigation apparatus, since it is possible to omit the map correction amount storage means 104.

Variant Embodiment #5

In the embodiments described above, when calculating the position correction amount for a node in the steps 515 and 517 of FIG. 6, it would also be acceptable to arrange to proceed as follows if the number of links that are connected to that node is three or more.

Figure 13:
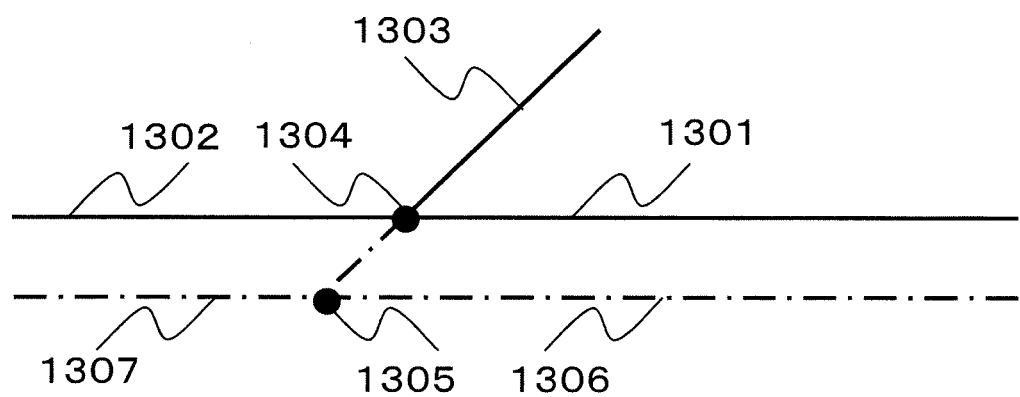
FIG. 13 is a figure showing an example of correction of a node that is connected to three links.

For example, let us consider the case shown in FIG. 13 of calculating the position correction amount for a node 1304 to which links 1301, 1302, and 1303 are connected. It should be understood that the links 1301 and 1302 are included either in the traveling link series or in some parallel link series. In this type of case, the node 1304 is shifted after correction to the position of the node 1305, i.e. along the direction of the link 1303 that is not included in the traveling link series or parallel link series. And, along with the links 1301 and 1302 being shifted after correction to the positions of the links 1306 and 1307 respectively so as to match this position of the node 1305 after correction, also the link 1303 is shifted. By doing this, no azimuth error is generated in the link 1303 after correction, since its azimuth has not been changed. As a result, no negative influence is exerted upon the map matching, and it is possible to prevent mis-matching.

Variant Embodiment #6

In the embodiment described above, when the position correction amounts for nodes are calculated in the steps 515 and 517 of FIG. 6, if the number of links that are connected to a node is four or more, then it would also be acceptable to employ Equations 24 through 26 as described below. In concrete terms, by repeatedly calculating Equations 24 through 26, a position correction amount $(x_d, y_d)$ is calculated such that the value of $E_j$ in Equation 24, that corresponds to the sum of squares of the amounts of change of azimuth of the various links that are connected to that node, becomes a minimum. In Equations 24 through 26, m denotes the number of links that are connected to that node, $(x_{n0}, y_{n0})$ denotes the position of that node, $(x_{ni}, y_{ni})$ denotes the positions of the nodes that are on the opposite ends to that node of the links that are connected to that node, and j denotes the number of times that repeated calculation is performed.

which the number of links that are connected to the node is less than four, in other words is two or three.

Variant Embodiment #7

In the embodiment described above it would also be acceptable to omit the sensor means 102 of FIG. 1, and to omit the processing by the sensor means of 102 in the step 202 of FIG. 2. In this case it is desirable, in the position estimation processing of the step 203, for the position estimation means 111 to omit terms that are related to the sensor means 102 in Equations 1 through 7 described above, as being unnecessary terms. In other words, in Equations 1 through 7, the terms that correspond to the pitch φ(t) should be deleted from each of the state value vector η(t), the matrix F, the matrix G, the state transition matrix Φ(Δt, αa, αω), and Q(k). Moreover, terms that correspond to the sensed speed vs(t), the sensed angular velocity ωs(t), and the sensed acceleration gs(t) should be deleted from each of the observed value vector y, the matrix H, and the observation noise covariance matrix R. By doing this, it is possible to reduce the manufacturing cost of the car navigation apparatus, since it is possible to omit the sensor means 102 and the associated quantity of calculation processing.

Variant Embodiment #8

Figure 14:
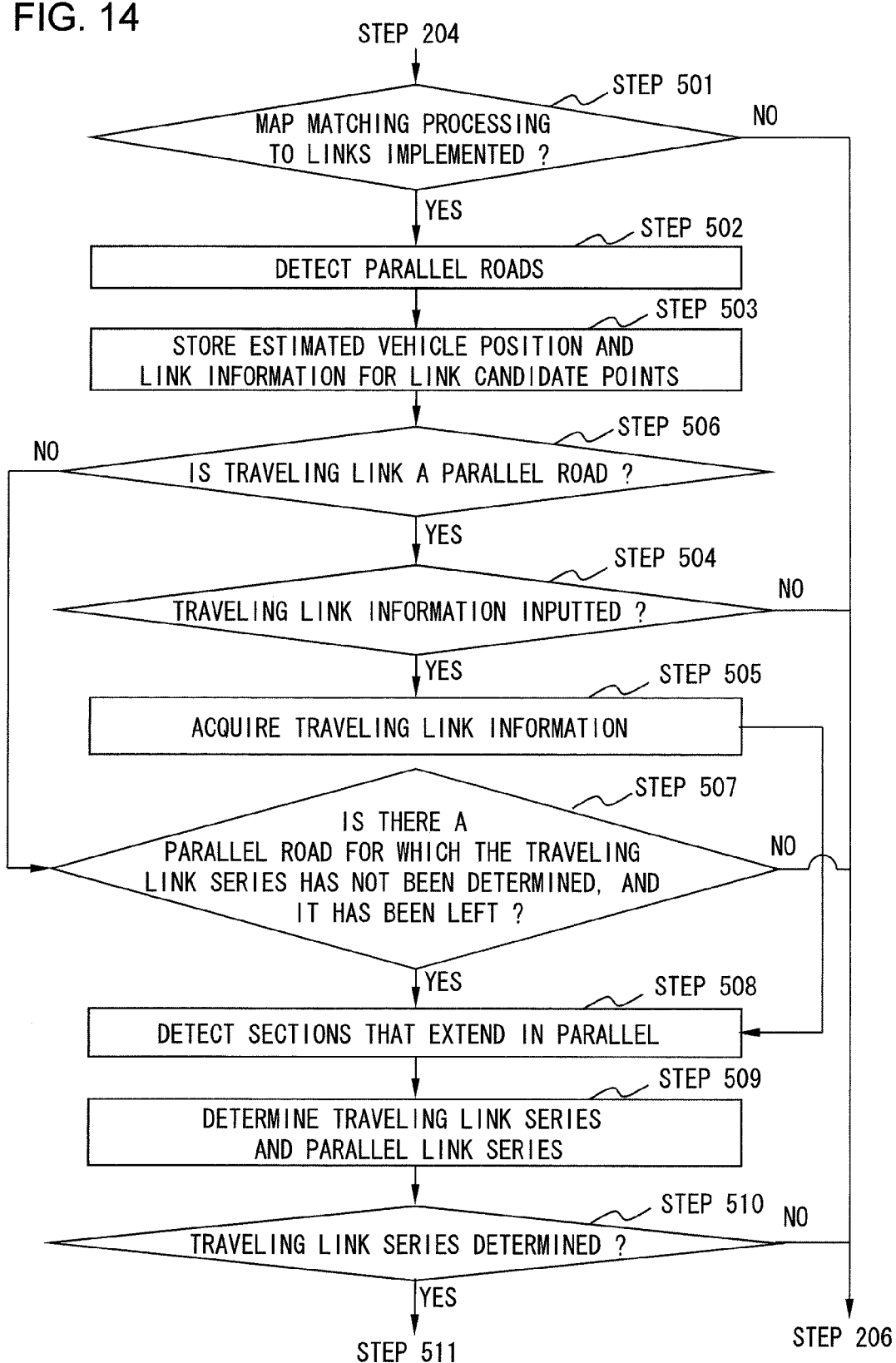
FIG. 14 is a figure showing a variant embodiment of the operation of link position correction.

In the embodiment described above, it would also be acceptable to arrange to change the order of the steps 504, 505, and 506 of FIG. 6 to the order of steps 506, 504, and 505 as shown in FIG. 14. In this case, after the step 505 concludes, the flow of control proceeds to the step 508. By doing this, if the traveling link determination means 122 has determined in the step 506 that the vehicle is traveling on one of several parallel roads, then in the step 505 the link number of the road upon which the vehicle is traveling is acquired from the traveling position designation means 107, and in the step 509 it is possible to determine upon the traveling link series and the parallel link series. And, even for this traveling link series and parallel link series that include links extending ahead of the vehicle, the link position correction means 125 is able to correct the positions of the links for which the correction amounts are calculated in the steps 515 and 517 of FIG. 6. As a result, even if the position error for a parallel road upon which the vehicle is traveling for the first time is large, it is still possible to perform matching to the correct link.

$$E_j = \sum_{i=1}^{m} \left( \tan^{-1} \frac{y_{n0} + y_{dj} - y_{ni}}{x_{n0} + x_{dj} - x_{ni}} - \tan^{-1} \frac{y_{n0} - y_{ni}}{x_{n0} - x_{ni}} \right)^2 \quad \text{(Equation 24)}$$

$$\begin{bmatrix} x_{dj+1} \\ y_{dj+1} \end{bmatrix} = \begin{bmatrix} x_{dj} \\ y_{dj} \end{bmatrix} + (B^T B) B^T (E_j - E_{j-1}) \quad \text{(Equation 25)}$$

$$B = \begin{bmatrix} \sum_{i=1}^{m} \left( \tan^{-1} \frac{y_{n0} + y_{dj} - y_{ni}}{x_{n0} + x_{dj} - x_{ni}} - \tan^{-1} \frac{y_{n0} - y_{ni}}{x_{n0} - x_{ni}} \right) \frac{(y_{n0} + y_{dj} - y_{ni})^2}{(x_{n0} + x_{dj} - x_{ni})^2 - (y_{n0} + y_{dj} - y_{ni})^2} \\ \sum_{i=1}^{m} \left( \tan^{-1} \frac{y_{n0} + y_{dj} - y_{ni}}{x_{n0} + x_{dj} - x_{ni}} - \tan^{-1} \frac{y_{n0} - y_{ni}}{x_{n0} - x_{ni}} \right) \frac{y_{n0} + y_{dj} - y_{ni}}{(x_{n0} + x_{dj} - x_{ni})^2 - (y_{n0} + y_{dj} - y_{ni})^2} \end{bmatrix} \quad \text{(Equation 26)}$$

It should be understood that, in the explanation above, a case in which the number of links that are connected to the node is four or more is shown as an example; but, it would also be acceptable to apply this variant embodiment to a case in In this variant embodiment, when the vehicle is traveling upon a parallel road for which there is some positional deviation in the road information stored in the map information storage means 103, when the user designates a road that corresponds to the traveling position of the vehicle by using the traveling position designation means 107, it is possible for the traveling link series and the parallel link series to be immediately determined by the traveling link determination means 122. As a result, it is possible for the positions of the traveling link series and the parallel link series to be immediately corrected by the link position correction means 125, and it is possible to shift both the traveling link series and the parallel link series upon the road map displayed by the screen and audio output means 105 to match their positions after correction.

Variant Embodiment #9

In the embodiments described above, in the step 502 of FIG. 5 or FIG. 14, it would also be possible to detect parallel roads while considering the result of road deviation determination. In other words, if in the step 309 of FIG. 3 it is decided that the vehicle is traveling upon a road, and moreover, among the other link candidate points whose distances, azimuth differences, and angles with respect to the first link candidate point have been calculated, a link candidate point exists that satisfies the condition that its distance and azimuth difference are both within their respective predetermined threshold values, and moreover that its angle is within a predetermined range from 90°, then it is decided that the link that corresponds to the first link candidate point and the link that corresponds to that link candidate point are parallel roads that extend mutually in parallel.

Variant Embodiment #10

In the embodiment described above, in the step 515 of FIG. 5, a point is obtained by dropping a perpendicular line from each node of the parallel link series that is included within the first correction range upon the traveling link series, and the two nodes within the traveling link that are on both sides of this point that are closest to that point are obtained. Even if $L_{np1}$ and $L_{np2}$ are taken as being the distances from that point to two nodes within the traveling link series that are close to that point, position correction amounts for those nodes that are included in the parallel link series can still be calculated.

Variant Embodiment #11

In the embodiment described above it would also be acceptable not to perform calculation of correction amounts for the node positions, if the result of road deviation in the flow chart of FIGS. 5 and 6, or in the flow chart of FIGS. 14 and 6, is that there is a road deviation. In concrete terms, between the steps 503 and 504 of FIG. 5, between the steps 504 and 506, or between the steps 503 and 506 of FIG. 14, the correction of link position in the step 205 of FIG. 2 terminates, and the flow of control proceeds to the step 206.

Variant Embodiment #12

Figure 15:
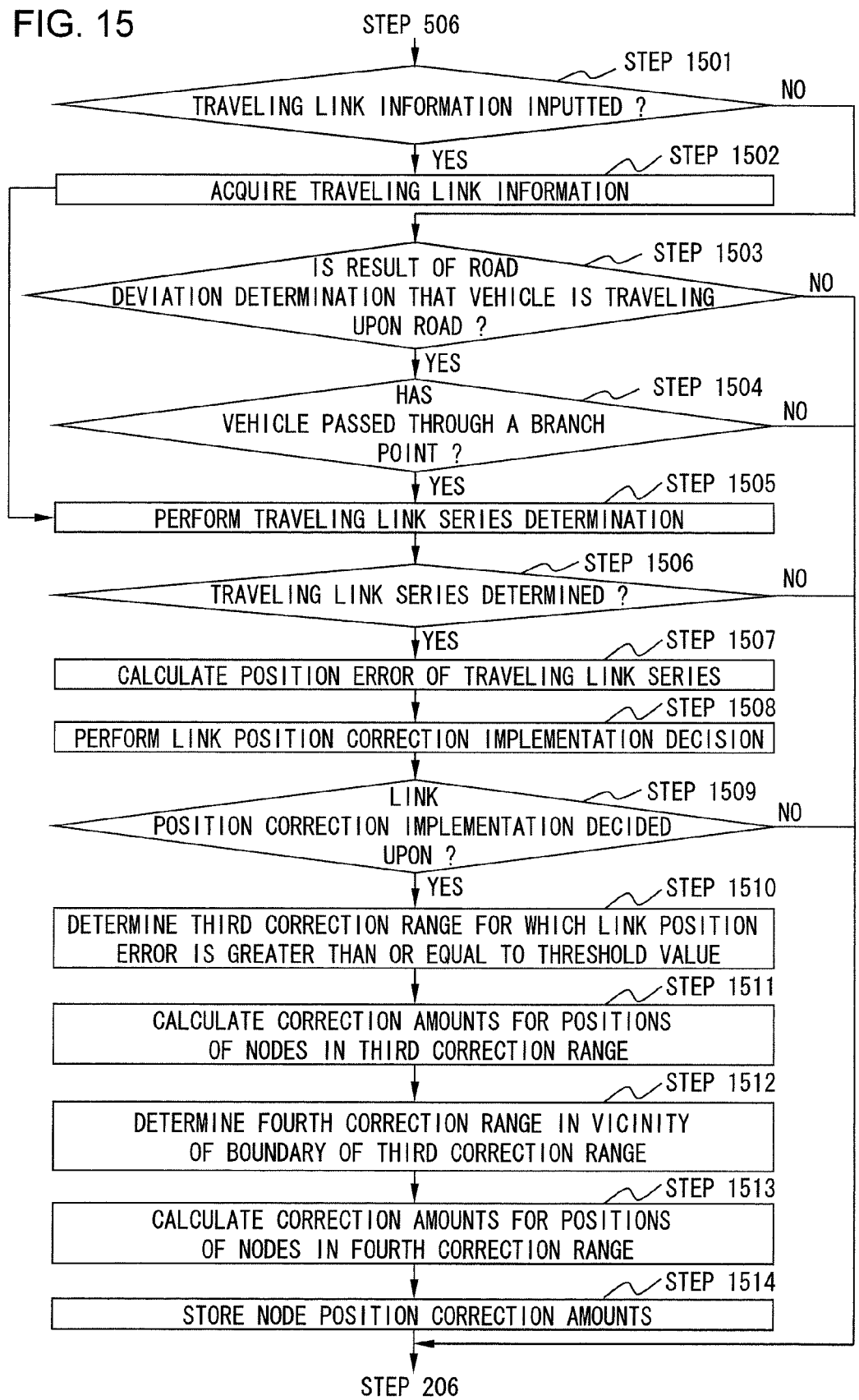
FIG. 15 is a figure showing another variant embodiment of the operation of link position correction.

In the embodiment described above, it would also be acceptable to arrange to perform the operating procedure shown in the flow chart of FIG. 15 if, in the step 507 of FIG. 5 or FIG. 14, it has been decided that this is not a parallel road that has been determined not to be in the traveling link series. When this is done, it is possible to correct the positions of the links of roads that are not parallel roads. In this embodiment, in the steps 1512 and 1513 of FIG. 15, a fourth correction range is determined that is outside a third correction range in which the position error of the traveling link series is greater than or equal to a threshold value, and the positions of the nodes within this fourth correction range are corrected. Due to this, even though the link positions within the third correction range are corrected, it is possible to reduce the azimuth error generated in the links that are connected to those links. As a result, it is possible to reduce the negative influence upon the evaluation values in the map matching processing, and it is possible to prevent matching to erroneous links.

The procedure shown in the flow chart of FIG. 15 will now be explained in the following.

In a step 1501, the traveling link determination means 122 makes a decision as to whether or not traveling link information has been inputted from the user to the traveling position designation means 107. If traveling link information has been inputted, then the flow of control proceeds to a step 1502, whereas if it has not then the flow of control is transferred to a step 1503.

In the step 1502, the traveling link determination means 122 receives and stores the link number of the road upon which the vehicle is traveling that has been received from the traveling position designation means 107, in other words the link number of the road that has been inputted from the user as being the traveling link.

In the step 1503, the traveling link determination means 122 proceeds to the step 1504 if the current road deviation determination result is that the vehicle is traveling upon the road. But if the vehicle has deviated from the road, then the correction of link position in the step 205 of FIG. 2 terminates, and the flow of control proceeds to the step 206.

In the step 1504, the traveling link determination means 122 makes a decision as to whether or not, when the processing subsequent to the steps 502 of FIG. 5, FIG. 6, and FIG. 15 is being executed repeatedly each time the vehicle traverses the predetermined distance described in the step 307 of FIG. 3, between the previous cycle of processing and the present, the vehicle has passed through a branch point. If the vehicle has passed through a branch point, then the flow of control proceeds to a step 1505. But if the vehicle has not passed through a branch point, then the correction of link position in the step 205 of FIG. 2 terminates, and the flow of control proceeds to the step 206.

In the step 1505, the traveling link determination means 122 determines the traveling link series. Here, a decision is made as to whether or not a link joins from the link of the first candidate link point for which the step 1505 of FIG. 15 was implemented in the previous cycle to the link of the first candidate point in this cycle. If the links of the first link candidate points are connected, then it is determined that the link series including the link that is the first link candidate point is the series of links upon which the vehicle is traveling. On the other hand, if the links of the first link candidate point are not connected, and moreover a link number of the road upon which the vehicle is traveling has been acquired from the traveling position designation means 107, then it is determined that the link series that includes the links corresponding to those link numbers is the series of links upon which the vehicle is traveling. It should be understood that, if the links of the first candidate link point are not connected, and moreover no link number for the road upon which the vehicle is traveling is acquired from the traveling position designation means 107, then no determination of the traveling link series is performed. Here, the determinations as to whether or not the links are connected are made on the basis of whether or not the node numbers of the start point of one link and the end point of another link are the same.

Then in a step 1506, the traveling link determination means 122 makes a decision as to whether or not it has been possible to determine the traveling link series in the step 1505. If it has been possible to determine the traveling link series, then the flow of control proceeds to a step 1507. On the other hand, if it has not been possible to determine the traveling link series, then the correction of link position in the step 205 of FIG. 2 terminates, and the flow of control proceeds to the step 206.

In the step 1507, the link position correction implementation decision means 123 calculates the position errors for the traveling link series. Here, for each link candidate point upon the traveling link series, the distance is calculated to the estimated position that corresponds to that link candidate point, in other words to the estimated position when that link candidate point was obtained. It should be understood that the distances that are calculated here are equivalent to the position errors of the traveling link series with respect to the estimated positions.

Then in a step 1508, on the basis of the position errors of the traveling link series that have been calculated in the step 1507, the link position implementation decision means 123 makes a decision as to whether to implement correction of the link positions. Here, the distances that have been calculated as the position errors of the traveling link series with respect to the estimated positions are each compared with a predetermined threshold value, and if there is even one among them that is greater than or equal to the predetermined threshold value, then the decision is taken to implement correction of the link positions. On the other hand, if all of the position errors of the traveling link series are less than the threshold value, then the decision is taken not to implement link position correction. It should be understood that the threshold value that is used in this decision is equivalent to the permissible amount for the link position error during map matching, as previously described.

Then in a step 1509, the link position correction implementation decision means 123 makes a decision as to whether or not it has been decided to implement correction of the link positions in the step 1508. If it has been decided to implement correction of the link positions, then the flow of control proceeds to a step 1510, but, if it has been decided not to implement correction of the link positions, then the correction of link position in the step 205 of FIG. 2 terminates, and the flow of control proceeds to the step 206.

In the step 1510, the link position correction range determination means 124 determines a third correction range for correction of the link positions on the basis of the traveling track of the vehicle. Here, a range for which the position errors in the traveling link series exceed the threshold value is determined as being the third correction range. In more concrete terms, among the links that are included in the traveling link series, one or two or more links are specified, each of which corresponds to a link candidate point for which it was decided, in the step 1508, that the position error was greater than or equal to the threshold value. And a range that includes all of these links is set as being the third correction range.

Then, in a step 1511, the link position correction means 125 calculates position correction amounts for the node positions in the traveling link series that are included in the third correction range. Here, for each link in the traveling link series, the distance between each link candidate point upon that link and the estimated position that corresponds thereto is calculated, and the average of these is taken as being the position error $e_l$ of that link. And, using Equations 19 and 20 described above, a position correction amount ($\Delta x_{rn}$, $\Delta y_{rn}$) is calculated for each node that is included in the traveling link series.

Then in a step 1512, the link position correction range determination means 124 determines a fourth correction range in the vicinity of the boundary of the third correction range. Here, the distances are calculated along the links from the nodes of the traveling link series that are each positioned at the boundary of the third correction range, to nodes that are positioned outside of the boundary. A range for which these distances are within the distance $L_m$ calculated by Equation 22 is taken as being the fourth correction range. Here, in Equation 22, $e_{bn}$ denotes a value that is obtained by combination of the x component $\Delta x_{pnb}$ and the y component $\Delta y_{pnb}$ of the position correction amount of a node in the traveling link series at the boundary of the third correction range, in other words the position error of the link within the third correction range that is connected to that node, while $\theta_p$ denotes the permissible amount of azimuth error during map matching.

Then in a step 1513, using Equation 23, the link position correction means 125 calculates position correction amounts ($\Delta x_{ns}$, $\Delta y_{ns}$) for the nodes that are included in the fourth correction range. Here, in Equation 23, $L_{ns}$ denotes the distance along the link from the node at the boundary of the third correction range to that node, while $\theta_{lb}$ denotes the azimuth of the link at the boundary of the third correction range.

Then in a step 1514, the link position correction means 125 stores the position correction amounts for the nodes that were calculated in the steps 1511 and 1513 and their node numbers within the map correction amount storage means 104 in storage regions having parcel numbers corresponding to those nodes.

Variant Embodiment #13

In the embodiment of Variant Embodiment #12, during correction of the link positions, azimuth errors corresponding to the permissible azimuth error amount are generated in each of the links within the fourth correction range. Thus it would also be acceptable to arrange to eliminate the azimuth errors in the links due to this type of correction, in the following manner.

In the step 1514 of FIG. 15, for each node that is to be the subject of correction, in addition to the node numbers and the position correction amounts for the nodes described above, the link position correction means 125 also stores the types of correction range to which those nodes belong (i.e. the third correction range or the fourth correction range) in the map correction amount storage means 104. And, on the basis of this type of correction range, when performing the processing of map matching to a link in the step 308 of FIG. 3, the map matching means 112 decides to which of the third correction range and the fourth correction range a node whose position has been corrected in the step 205 belongs. In other words, if the position of at least one node among the nodes at the two ends of links corresponding to link candidate points whose evaluation values T are to be calculated has been corrected in the step 205, then it is decided to which of the third correction range and the fourth correction range this node belongs.

If the result is that at least one node belongs to the fourth correction range, then, instead of the azimuth $\theta_l$ of that link candidate point, the evaluation value T is calculated using the link azimuth corresponding to the node position before correction. On the other hand, if it has been decided that all of the nodes at both ends of the links belong to the third correction range, then, instead of the azimuth $\theta_l$ of that link candidate point, the evaluation value T is calculated using the link azimuths corresponding to the node position after correction. Moreover, in any other case, the link azimuth is calculated from the node positions of the nodes as specified in the road information stored in the map information storage means 103, instead of from the azimuth $\theta_l$ of that link candidate point, and the evaluation value T is calculated using that azimuth. If this is done, then it is possible to eliminate errors in the link azimuths that are generated due to position correction, and thus it is possible to reduce the errors in the evaluation values T. As a result, it is possible to prevent matching to erroneous links.

Variant Embodiment #14

In the embodiment described above, in addition to the position correction amounts for the nodes and their node numbers, the map correction amount storage means 104 also stores the number of times that corrections for those nodes have been performed. In the steps 515 and 517 of FIG. 6, or in the steps 1511 and 1513 of FIG. 15, a search is performed for whether or not a position correction amount for a node for which a position correction amount is to be calculated is stored in the map correction amount storage means 104, and, if no such amount is stored, then a position correction amount for the node is calculated by using Equation 19 and Equation 20, Equation 21, or Equation 23. But, if an amount is stored, then, along with calculating a position correction amount for the node by using Equation 19 and Equation 20, Equation 21, or Equation 23, also the position correction amount for that node, its node number, and the number of times it has been corrected are read in, and a position correction amount ($\Delta x_{na}$, $\Delta y_{na}$) for the node is calculated using Equation 27. Here, ($\Delta x_{nm}$, $\Delta y_{nm}$) and $n_m$ denote the position correction amount for that node and the number of times that position correction has been performed for it, as stored in the map correction amount storage means 104, while ($\Delta x_{nc}$, $\Delta y_{nc}$) denotes the position correction amount for that node that has been calculated in the steps 515 and 517 of FIG. 6, or in the steps 1511 and 1513 of FIG. 15, using Equation 19 and Equation 20, Equation 21, or Equation 23.

$$\begin{bmatrix} \Delta x_{na} \\ \Delta y_{na} \end{bmatrix} = \begin{bmatrix} \dfrac{n_m \Delta x_{nm} + \Delta x_{nc}}{n_m + 1} \\ \dfrac{n_m \Delta y_{nm} + \Delta y_{nc}}{n_m + 1} \end{bmatrix} \quad \text{(Equation 27)}$$

In the step 518 of FIG. 6 or in the step 1514 of FIG. 15, in addition to the position correction amounts and the node numbers of the nodes calculated in the steps 515 and 517 of FIG. 6 or in the steps 1511 and 1513 of FIG. 15, the link position correction means 125 also stores the numbers of times these nodes have been corrected within the map correction amount storage means 104, in the storage regions having the parcel numbers that correspond to those nodes. Here, if a position correction amount for a node is stored in the map correction amount storage means 104, then 1 is added to the number of corrections that is stored and the resulting value is stored, while, if no position correction amount is stored, then 1 is stored for the number of corrections. In this embodiment, the accuracy of position correction of the nodes is enhanced, since it is possible to perform averaging using these numbers of position correction amounts for the nodes that are equal to the numbers of times they have been corrected.

Variant Embodiment #15

Figure 16:
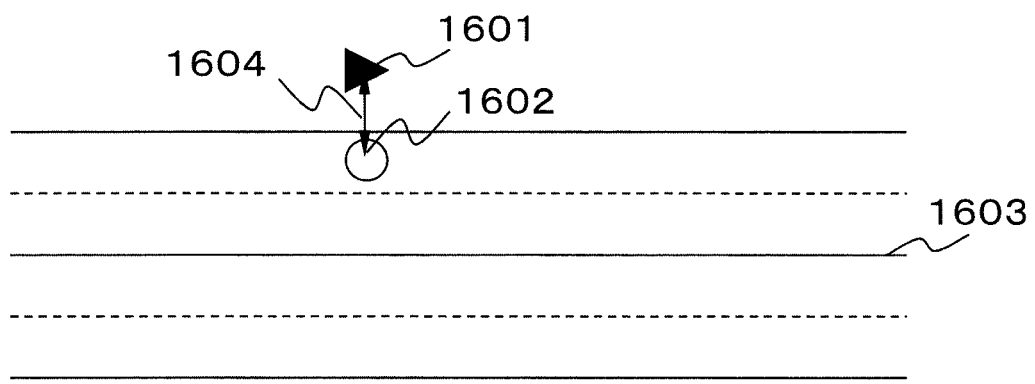
FIG. 16 is a figure showing distance between the estimated position of the vehicle and a link candidate point.

In the embodiment described above, instead of the position ($x_l$, $y_l$) of the link candidate point that is used in Equation 9, according to which the evaluation value $T_p$ is calculated in the step 308 of FIG. 3, and according to which the test statistic $T_p$ is calculated with Equation 13 in the step 309, it would also be acceptable, in consideration of the width of the link 1603 and the direction of travel of the vehicle, to use a position 1602 ($x_{l1}$, $y_{l1}$) that is disposed at the center of the road lane that is closest to the estimated position 1601, as shown in FIG. 16. Since, when this embodiment is used, it is possible to calculate the distance 1604 between the estimated position and the link candidate point in consideration of the width of the road, accordingly the accuracy of the evaluation value T becomes good, and it is possible to reduce mis-matching to erroneous links.

It should be understood that while, in the above explanation of the embodiment and variant embodiments, examples have been explained in which the car navigation apparatus is used by being mounted to an automobile, the present invention should not be considered as being limited to this application; the present invention could also be applied to a navigation device that is mounted to a vehicle of any of various sorts, other than an automobile. Furthermore, apart from being applied to a navigation apparatus that is used by being mounted to a vehicle, the present invention could also be applied to an information terminal of any of various types, such as, for example, a portable telephone, a smart phone, a personal computer, or the like.

The embodiment and the variant embodiments explained above are only given by way of example; the present invention is not to be considered as being limited by the details thereof, provided that the essential characteristics of the present invention are not lost.

What is claimed is:
1. A navigation apparatus, comprising:
a map information storage memory in which road information related to roads is stored;
a processor coupled to the map information storage memory, wherein the processor
estimates a position of a vehicle;
using the road information, specifies a plurality of link candidate points corresponding to the position of the vehicle as estimated;
on the basis of the plurality of link candidate points, detects links of parallel roads that extend mutually parallel to one another;
for each link of the parallel roads detected, determines whether it is a traveling link upon which the vehicle is traveling, or a parallel link that extends parallel to the traveling link;
obtains position correction amounts for nodes of the traveling link on the basis of the distance between the one of the plurality of link candidate points that corresponds to the traveling link, and the position of the vehicle as estimated; and
obtains position correction amounts for nodes of the parallel link on the basis of the correction amounts for nodes of the traveling link.

2. The navigation apparatus according to claim 1, wherein the processor makes a decision whether or not to implement link position correction, on the basis of the distance between the link candidate point that corresponds to the traveling link and the position of the vehicle as estimated, wherein:
the processor does not obtain position correction amounts for the nodes of the traveling link and the parallel link, if it has been decided not to implement link position correction.

3. The navigation apparatus according to claim 1, wherein the processor determines a first correction range on the basis of the distance between the link candidate point that corresponds to the traveling link and the position of the vehicle as estimated, wherein:
the processor obtains position correction amounts for nodes that are included in a traveling link series constituted by a plurality of the traveling links or a parallel link series constituted by a plurality of the parallel links, and that are within the first correction range.

4. A navigation apparatus comprising:
a map information storage memory in which road information related to roads is stored;
a processor coupled to the map information storage memory, wherein the processor
estimates a position of a vehicle;
using the road information, specifies a plurality of link candidate points corresponding to the position of the vehicle as estimated;
on the basis of the plurality of link candidate points, detects links of parallel roads that extend mutually parallel to one another;
for each link of the parallel roads detected, determines whether it is a traveling link upon which the vehicle is traveling, or a parallel link that extends parallel to the traveling link;
obtains position correction amounts for nodes of the traveling link and of the parallel link on the basis of the distance between the one of the plurality of link candidate points that corresponds to the traveling link, and the position of the vehicle as estimated;
determines a first correction range on the basis of the distance between the link candidate point that corresponds to the traveling link and the position of the vehicle as estimated;
obtains position correction amounts for nodes that are included in a traveling link series constituted by a plurality of the traveling links or a parallel link series constituted by a plurality of the parallel links, and that are within the first correction range;
determines a second correction range on the basis of a value obtained by dividing the position correction amount of nodes that are positioned at the boundary of the first correction range by the tangent of a predetermined permissible azimuth error; and
obtains position correction amounts for nodes that are included in the traveling link series or the parallel link series, and that are within the second correction range, on the basis of the position correction amounts of the nodes that are positioned at the boundary of the first correction range, and the distances from the nodes that are positioned at the boundary of the first correction range to those nodes.

5. The navigation apparatus according to claim 4, further comprising a map correction amount storage memory, for nodes for which position correction amounts have been obtained by the processor, which stores those position correction amounts, wherein:
the processor corrects the positions of nodes for which position correction amounts have been obtained and specifies the plurality of link candidate points, on the basis of the position correction amounts stored in the map correction amount storage memory.

6. The navigation apparatus according to claim 5, wherein:
the map correction amount storage memory, for each node for which a position correction amount has been obtained, in addition to that position correction amount, also stores a correction range type that specifies whether that node belongs to the first correction range or to the second correction range;
for a link candidate point, among the plurality of link candidate points, that corresponds to a link of which the position of at least one node has been corrected, the processor decides to which of the first correction range or to the second correction range that node belongs, on the basis of the correction range type stored in the map correction amount storage memory;
if it has been decided that both the nodes at the two ends of a link that corresponds to the link candidate point both belong to the first correction range, the processor calculates an evaluation value for the link candidate point using the link azimuth corresponding to the node position after correction; and
if it has been decided that at least one of the nodes at the two ends of a link that corresponds to the link candidate point belongs to the second correction range, the processor calculates the evaluation value for the link candidate point using the link azimuth corresponding to the node position before correction.

7. The navigation apparatus according to claim 1, wherein:
for a node among the nodes of the traveling link and the parallel link to which a plurality of links are connected, the processor obtains the position correction amount for that node so that the sum of squares of the amount of azimuth change of each link connected to that node becomes a minimum.

8. The navigation apparatus according to claim 1, further comprising a traveling position indication device that indicates the road upon which the vehicle is traveling on the basis of input from a user, wherein:
the processor determines the traveling link on the basis of indication from the traveling position indication device.

9. A navigation apparatus, comprising:
a map information storage memory that stores road information related to roads;
a processor coupled to the map information storage memory, wherein the processor
estimates a position of a vehicle; and
using the road information, specifies a plurality of link candidate points corresponding to the position of the vehicle as estimated;
a traveling position input device that indicates the road upon which the vehicle is traveling on the basis of input from a user;
wherein the processor
on the basis of indication from the traveling position input device, determines whether it is a traveling link upon which the vehicle is traveling, or a parallel link that extends parallel to the traveling link;
obtains position correction amounts for nodes of the traveling link on the basis of the distance between the one of the plurality of link candidate points that corresponds to the traveling link, and the position of the vehicle as estimated; and
obtains position correction amounts for nodes of the parallel link on the basis of the correction amounts for nodes of the traveling link; and
a display screen that displays a road map using the road information and shifts the traveling link and the parallel link upon the road map, so as to match their positions after correction by the processor.

* * * * *